(12) United States Patent
Kato

(10) Patent No.: US 6,754,903 B2
(45) Date of Patent: Jun. 22, 2004

(54) DISC DEVICE

(75) Inventor: Kazunari Kato, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 302 days.

(21) Appl. No.: 10/103,151

(22) Filed: Mar. 21, 2002

(65) Prior Publication Data

US 2002/0150027 A1 Oct. 17, 2002

(30) Foreign Application Priority Data

Mar. 22, 2001 (JP) .......................................... 2001-082146
Jul. 31, 2001 (JP) .......................................... 2001-231004

(51) Int. Cl.$^7$ .......................................... G11B 17/028
(52) U.S. Cl. .................................................... 720/713
(58) Field of Search .......................... 360/99.05, 99.12; 369/75.1, 75.2, 77.1, 258, 264, 270; 720/703, 706, 713, 619, 624

(56) References Cited

U.S. PATENT DOCUMENTS

| | | | | |
|---|---|---|---|---|
| 4,040,106 A | * | 8/1977 | Medley | ........................ 360/60 |
| 4,339,778 A | * | 7/1982 | Wise | ........................... 369/180 |
| 4,669,076 A | * | 5/1987 | Broom et al. | ............... 369/77.1 |
| 4,740,937 A | * | 4/1988 | Watanabe | .................. 369/13.2 |
| 5,060,096 A | * | 10/1991 | Hirose et al. | ............. 360/99.12 |
| 5,226,028 A | * | 7/1993 | Yamada et al. | ............. 369/77.1 |
| 5,241,530 A | * | 8/1993 | Kobayashi et al. | .......... 369/264 |
| 6,192,019 B1 | | 2/2001 | Kurokawa et al. | |

FOREIGN PATENT DOCUMENTS

| | | | |
|---|---|---|---|
| JP | 3-185671 | * | 8/1991 |
| JP | 10-312628 | * | 11/1998 |

* cited by examiner

Primary Examiner—David Ometz
(74) Attorney, Agent, or Firm—Brinks Hofer Gilson & Lione

(57) ABSTRACT

A disc device in which a clamping member for supporting a clamper is pushed against a supporting portion by a holding elastic member. At the side opposite the supporting portion, a clamping elastic member is provided between a drive chassis and the clamping member. The distance from a supporting fulcrum to a portion upon which the elastic force of the clamping elastic member acts is greater than the distance from the supporting fulcrum to a portion upon which a clamping force acts, so that the elastic force of the clamping elastic member for setting the clamping force can be small. Therefore, a large localized force does not act upon the clamping member from the clamping elastic member. In a conventional vehicle-mounted disc device, a spring having a large elastic force is used to exert a clamping force to clamp a disc by a clamper. Therefore, a large localized force acts on a clamping member for supporting the clamper. In addition, a large force is required to lift the clamping member. The present invention solves these problems.

20 Claims, 14 Drawing Sheets

DISC DEVICE

BACKGROUND OF THE INVENTION

1. Field of the Invention

The present invention relates to a disc device for rotatably holding a disc, such as a compact disc (CD) or a digital video disc (DVD), or a disc used in, for example, a compact disc read only memory (CD-ROM). More particularly, the present invention relates to a disc device which makes it possible to reduce a load on a mechanical part and which can reliably clamp a disc.

2. Description of the Related Art

FIGS. 14A and 14B are side views of the main portion of a conventional vehicle-mounted disc device. FIG. 14A shows an unclamped state of a disc, while FIG. 14B shows a clamped state of the disc.

In the disc device, a slit-like insertion slot 2 is formed in a face provided at the front surface of a housing 1. A disc D is inserted into the housing 1 from the insertion slot 2. A transfer roller 4 and a roller supporting member 3 for supporting the transfer roller 4 are provided inwardly of the insertion slot 2. A guide member 5 is provided above the transfer roller 4.

A supporting base 6 that is supported in an elastically raised state by, for example, a clamper is provided inside the housing 1. A spindle motor M and a turntable T, rotationally driven by the spindle motor M, are provided on the supporting base 6. In addition, an optical head (not shown) and other component parts are provided on the supporting base 6. A clamping member 7 is rotatably supported on the supporting base 6 through a supporting shaft 9. A clamper 8 for clamping a disc D on the turntable T as a result of pushing the disc D is rotatably supported at an end of the clamping member 7. A coil spring 10 for urging the clamping member 7 in the direction of the turntable T is provided near the supporting shaft 9.

In FIG. 14A, the clamping member 7 is lifted by an unclamping member (not shown), so that there is a gap between the turntable T and the clamper 8. When the disc D is inserted from the insertion slot 2, the disc D that is clamped by the transfer roller 4 and the guide member 5 is transferred into the gap between the turntable T and the clamper 8. When the center of the disc D and the center of the turntable T coincide, a lifting force of the unclamping member on the clamping member 7 is removed. At this time, because of the elastic force of the coil spring 10, the clamping member 7 is rotated in the clockwise direction upon the supporting shaft 9 as a fulcrum, in order to, as shown in FIG. 14B, cause the clamper 8 to push the center portion of the disc D against the turntable T and to clamp the disc D.

Then, the spindle motor M rotates to rotationally drive the disc D by the turntable T, so that a signal recorded on the disc D is read by an optical head (not shown).

In the conventional disc device shown in FIG. 14, a moment Mc in the clockwise direction is applied to the clamping member 7 by the coil spring 10, so that, because of the moment Mc, a clamping force Fc for clamping the disc D is exerted on the clamper 8. Here, when the point upon which an elastic force f applied to the clamping member 7 from the coil spring 10 acts is expressed as 10a, and the distance from the center of the supporting shaft 9 to the elastic force f acting point 10a is expressed as L1, the moment Mc is equal to L1×f. In the clamped state shown in FIG. 14B, when the point upon which a clamping force Fc applied to the clamper 8 by the clamping member 7 acts is expressed as 7a, and a distance from the center of the supporting shaft 9 to the force acting point 7a is expressed as L2, Fc=(L1/L2)×f.

Therefore, the elastic force f of the coil spring 10 must be larger than the clamping force Fc required to clamp the disc D by the clamper 8 by a factor of L2/L1.

For example, in the case where, in order to clamp the disc D, a clamping force Fc of 3 N (approximately 306 gf) with respect to the clamper 8 is required, when L2/L1=4, the coil spring 10 needs to provide an elastic force f of 12 N (approximately 1.22 kgf).

When a coil spring 10 with such a large elastic force f is used, a large force is applied to the base of the clamping member 7 from the coil spring 10, so that a distortion tends to occur at the base of the clamping member 7. In addition, a large load also acts upon the portion of the clamping member 7 rotatably supported by the supporting shaft 9.

In the conventional structure, when the state of the disc D is to be changed to the unclamped state shown in FIG. 14A, the clamping member 7 is lifted by the unclamping member. Hitherto, a point upon which a lifting force Fu, applied to the clamping member 7 from the unclamping member, acts is set at the base end portion side of the clamping member 7. Accordingly, when the disc device is constructed so that the clamping member 7 is lifted obliquely upward with the supporting shaft 9 as a fulcrum, the distance that the clamping member 7 is lifted by the unclamping member can be made small by lifting the base end portion of the clamping member 7.

However, when the disc device is constructed so that the lifting force Fu is applied to the base of the clamping member 7, since the distance between the lifting force Fu acting point and the center of the supporting shaft 9 is small, a very large lifting force Fu is required. In general, the unclamping member comprises a cam plate that moves towards the left and right in FIGS. 14A and 14B, and lifts the clamping member 7 by an inclined groove formed in the cam plate. However, since a large lifting force Fu is required, a large driving force is required to move the cam plate. Therefore, a large frictional force acts between the cam plate and the clamping member 7, so that rattling and wearing at a sliding portion between the cam plate and the clamping member 7 tend to increase.

SUMMARY OF THE INVENTION

In order to overcome the above-described problems in a conventional device, it is an object of the present invention to provide a disc device, in which, even when a biasing member having a weak elastic force for applying a clamping force to a clamping member is used, a disc can be reliably clamped; in which, by a biasing force of the biasing member, distortion or wearing by driving does not easily occur in a mechanical component part; and in which a force required to unclamp the disc can be made small.

To this end, according to a basic form of the present invention, there is provided a disc device comprising a turntable for placing a center hole of a disc thereon, a clamper for clamping the disc along on the turntable, a clamping member including a clamping force acting portion for exerting upon the clamper a force for clamping the disc, a supporting portion for supporting the clamping member, and a clamping elastic member for producing a disc clamping moment having the supporting portion as a fulcrum with respect to the clamping member by action on the clamping member at a location separated from the supporting portion. In the disc device, the distance from the supporting portion to a biasing force acting portion upon which a biasing force of the clamping elastic portion acts is greater than the distance from the supporting portion to the clamping force acting portion.

In the present invention, by setting the positional relationship among the clamping portion supporting fulcrum of the supporting portion, the clamping force acting portion, and the biasing force acting portion as mentioned above, the clamping elastic member used may be one with a weak elastic force, so that it is possible to prevent a large localized force from acting on, for example, the clamping member.

When the structure of the basic form is used, the disc clamping moment may act directly on the clamping member from the clamping elastic member. Alternatively, when the structure of the basic form is used, the disc device may further comprise an intermediate member for being subjected to an elastic force from the clamping elastic member, in which the disc clamping moment acts on the clamping member through the intermediate member.

When the disc device further comprises an intermediate member for being subjected to an elastic force from the clamping elastic member, in which the disc clamping moment acts on the clamping member through the intermediate member, the disc device may further comprise unclamping means for moving the clamping member against the disc clamping moment in a direction in which the clamping member moves away from the turntable.

Here, by the action of the unclamping means, the clamping member may be lifted away from the turntable while the clamping member is kept in a posture parallel to the chassis at which the turntable is provided, or may be lifted so as to rotate with the supporting portion as a fulcrum.

When the disc device further comprises unclamping means for moving the clamping member against the disc clamping moment in a direction in which the clamping member moves away from the turntable, the disc device may further comprise a holding elastic member for biasing the clamping member towards the turntable at a supporting portion side.

When the holding elastic member is provided, the position of the supporting portion, serving as a fulcrum of the clamping member, can be stabilized.

When the disc device further comprises a holding elastic member for biasing the clamping member towards the turntable at a supporting portion side, the supporting portion may be provided at a chassis for supporting the turntable, and, by an elastic force of the holding elastic member, the clamping member may be biased so as to come into contact with the supporting portion.

When the disc device further comprises unclamping means for moving the clamping member against the disc clamping moment in a direction in which the clamping member moves away from the turntable, the supporting portion may protrude from the clamping member, a driving member for moving the supporting portion against the disc clamping moment in a direction in which the supporting portion moves away from the turntable may be provided at the unclamping means, and a portion where the supporting portion and the driving member engage may be a fulcrum for the disc clamping moment.

When the supporting portion protrudes from the clamping member, a driving member for moving the supporting portion against the disc clamping moment in a direction in which the supporting portion moves away from the turntable is provided at the unclamping means, and a portion where the supporting portion and the driving member engage is a fulcrum for the disc clamping moment, the disc device may further comprise a holding elastic member for biasing the supporting portion towards the turntable by biasing the driving member.

When the disc device further comprises unclamping means for moving the clamping member against the disc clamping moment in a direction in which the clamping member moves away from the turntable, the unclamping means for applying an unclamping force to the clamping member in the direction in which the clamping member moves away from the turntable may be provided at a side where the biasing force of the clamping elastic member acts, and a distance from the supporting portion to an unclamping force acting portion upon which the unclamping force exerted upon the clamping member from the unclamping means acts may be greater than the distance from the supporting portion to the clamping force acting portion.

When the disc device has this structure, the driving force of the driving member for moving the clamping member away from the turntable can be made small, thereby making it possible to reduce a drive load and to prevent excessive wear between mechanical parts.

When the disc device further comprises unclamping means for moving the clamping member against the disc clamping moment in a direction in which the clamping member moves away from the turntable, the disc device may further comprise a chassis having the turntable mounted thereto and being elastically raised and supported, and the unclamping means may include a lock portion for causing the chassis to be in a locked state when the clamping member is moved in the direction in which the clamping member moves away from the turntable. Alternatively, when the disc device further comprises unclamping means for moving the clamping member against the disc clamping moment in a direction in which the clamping member moves away from the turntable, the disc device may further comprise a transfer roller, disposed between the turntable and the clamper, for bringing in the disc, and the unclamping means may include a roller position controlling portion for moving the transfer roller away from a disc transfer position when the clamping member is moved towards the turntable.

Using the unclamping means, by locking and unlocking the chassis and by controlling the position of the transfer roller, a driving mechanism can be used in common, thereby simplifying the mechanism.

BRIEF DESCRIPTION OF THE DRAWINGS

FIG. 14A shows an unclamped state of a disc, and FIG. 14B shows a clamped state of the disc.

DESCRIPTION OF THE PREFERRED EMBODIMENTS

Hereunder, a description of the present invention will be given with reference to the figures.

Figure 1:
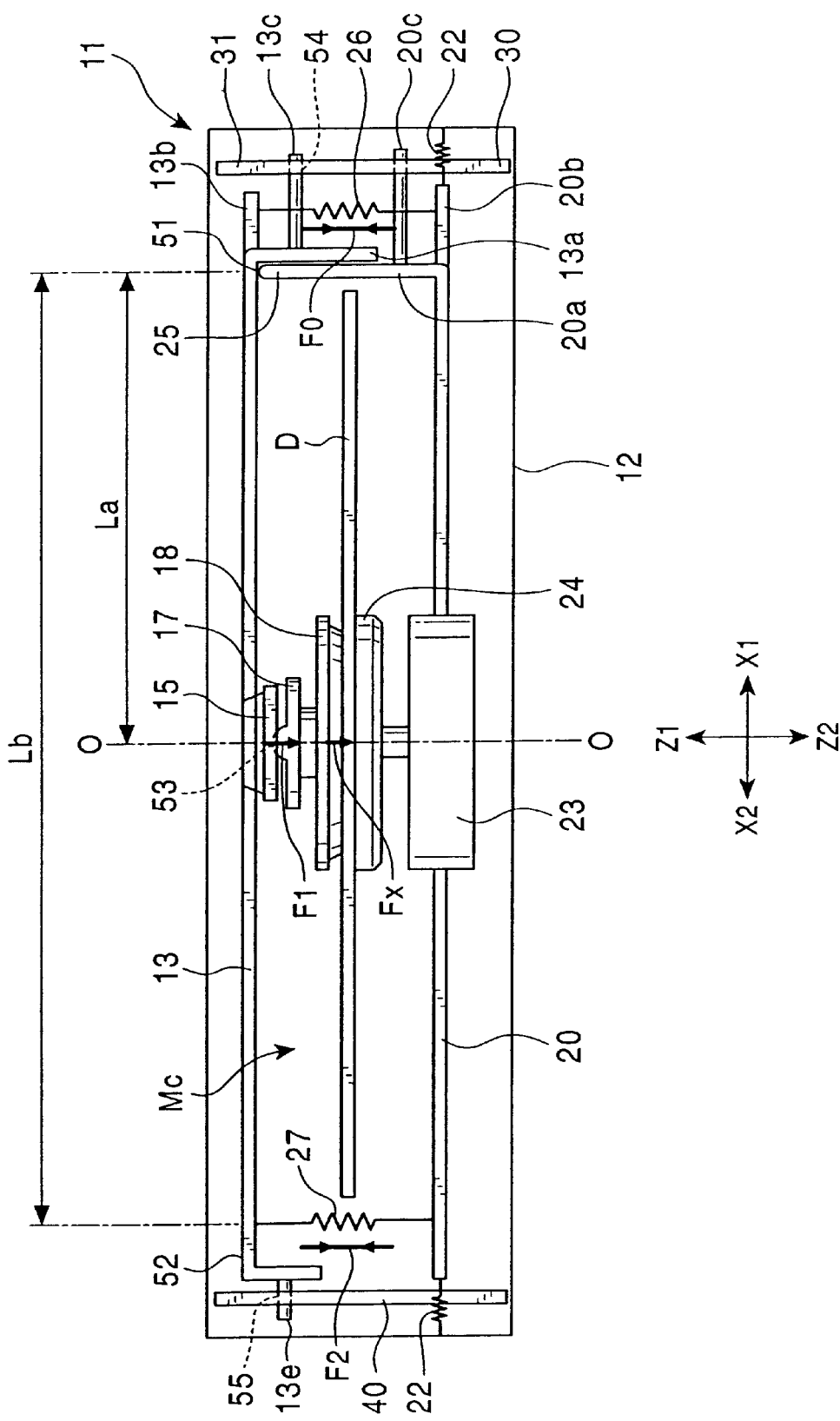
FIG. 1 is a front view of a disc device of a first embodiment of the present invention.

FIG. 1 shows a vehicle-mounted disc device 11. The disc device 11 comprises a clamping member 13 and a drive chassis 20 inside a housing 12 with a size of 1 DIN, ½ DIN, or ⅓ DIN, e.g. The drive chassis 20 is supported in an elastically raised state with respect to the housing 12 by elastic supporting members 22 provided at a plurality of locations inside the housing 12. The elastic supporting members 22 are coil springs or clampers having oil or air sealed in rubber bags.

Figure 2:
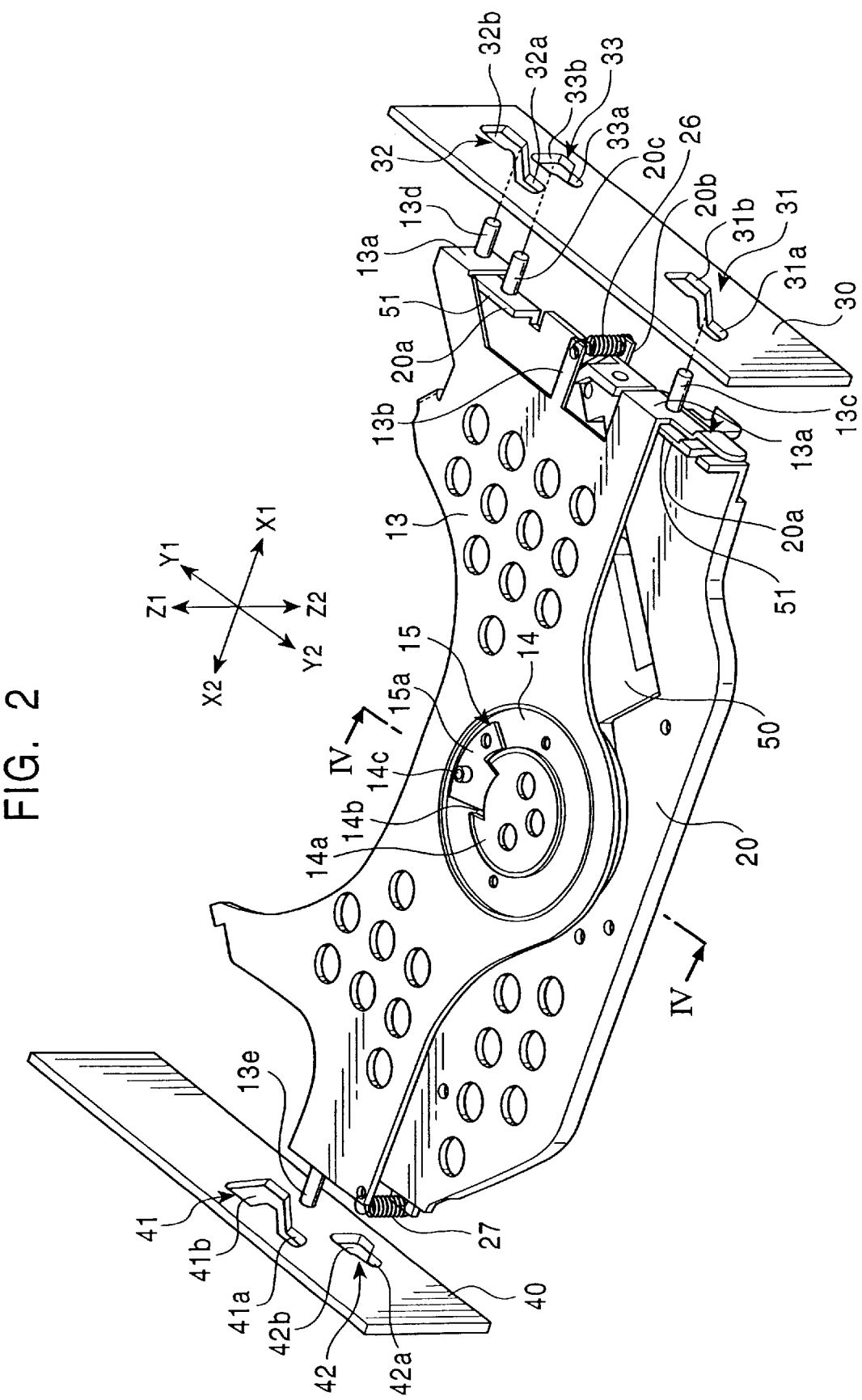
FIG. 2 is a perspective view of a clamping member and a drive chassis of the disc device shown in FIG. 1.
Figure 4:
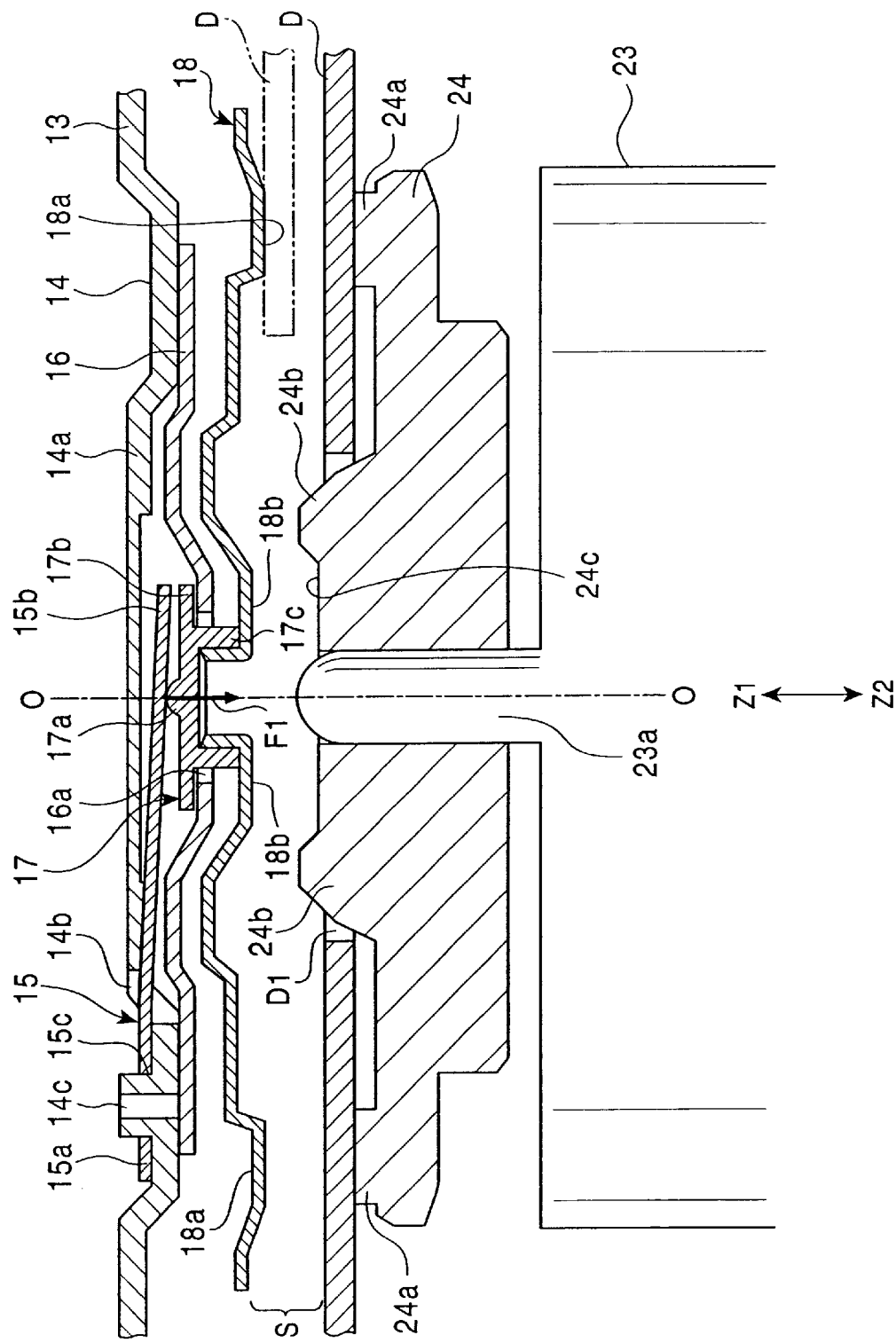
FIG. 4 is a sectional view taken along line IV—IV of FIG. 2, showing an unclamped state of a disc.
Figure 5:
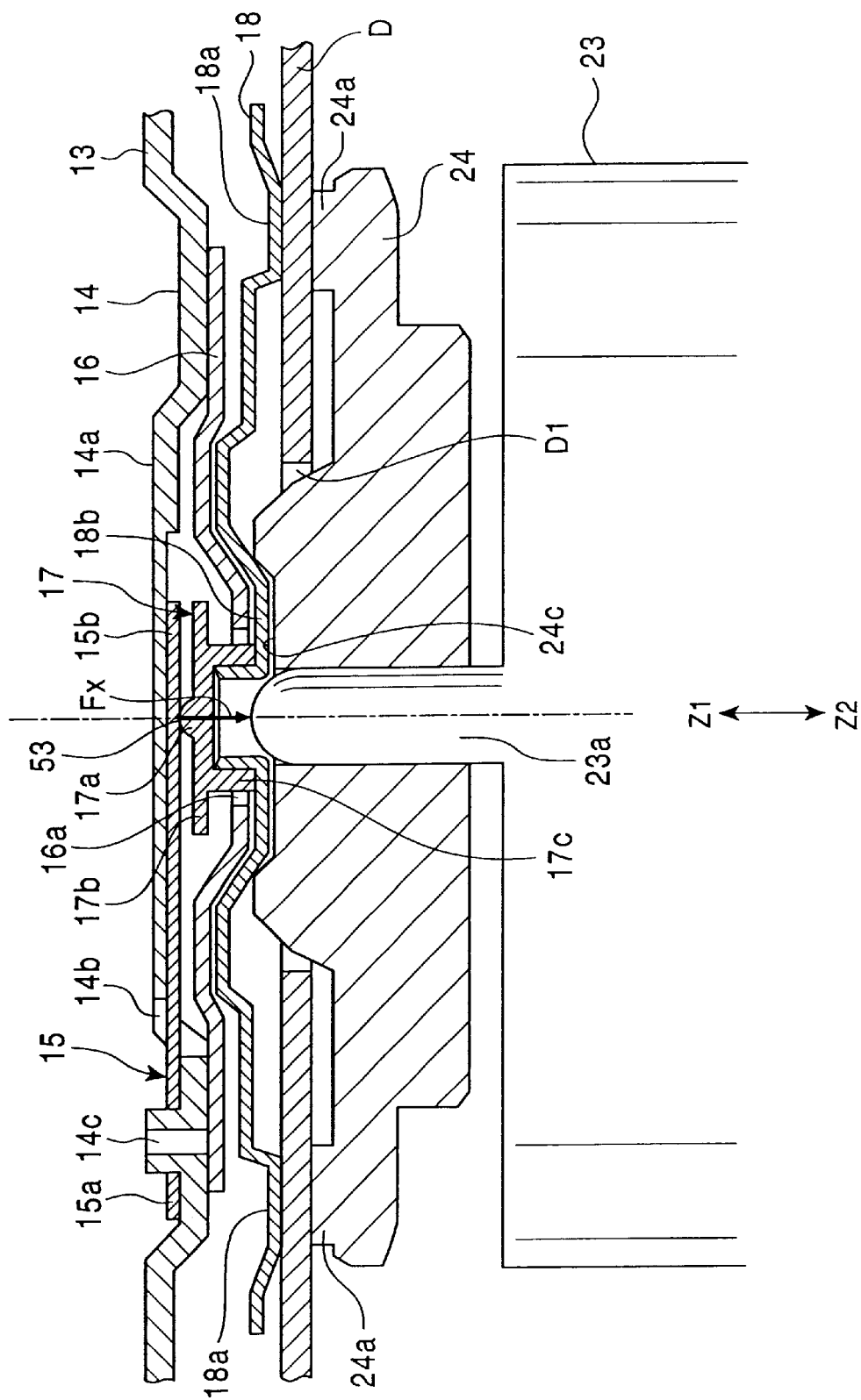
FIG. 5 is a sectional view taken along line IV—IV of FIG. 2, showing a clamped state of the disc.

As shown in FIGS. 2, 4, and 5, the clamping member 13 is formed by press-molding a sheet plate material. An annular depression 14 that is depressed towards the drive chassis 20 is formed in the center portion of the clamping member 13, and a protrusion 14a that protrudes upward in a circular shape is formed at the center portion of the depression 14. A notch 14b is formed from the depression 14 through the protrusion 14a. A biasing means 15, which is a plate spring, is mounted to the clamping member 13.

The biasing means 15 includes a fan-shaped base 15a provided along the depression 14, and a stopper hole 15c is formed in the base 15a. A protrusion 14c is integrally formed on the top surface of the depression 14 by burring. By caulking the stopper hole 15c of the base 15a to the protrusion 14c, the base 15a is secured to the top surface of the depression 14. A portion of the biasing means 15 extending from the base 15a extends through the notch 14b towards the area inside the protrusion 14a. A pushing portion 15b is formed at an end of the biasing means 15 extending into the protrusion 14a, and is located beneath the center portion of the circular protrusion 14a.

As shown in FIGS. 4 and 5, a bracket 16, formed of a sheet plate material, is fixedly provided at the bottom surface of the clamping member 13. A circular center hole 16a is formed in the center of the bracket 16. A rotation supporting member 17 is provided inside the center hole 16a. The rotation supporting member 17 may be formed of a resinous material or a metallic material. A push portion (pivot) 17a that protrudes upward (in the Z1 direction) is formed at the top surface of the rotation supporting member 17. The push portion 17a is in contact with the pushing portion 15b of the biasing means 15, and is always biased downward (in the Z2 direction) in FIGS. 4 and 5 by a biasing force F1 of the biasing means 15 so as to approach a disc D.

A flange 17b extending in a radially circumferential direction is formed at the top end of the rotation supporting member 17. A circular cylindrical portion 17c that opens downward is integrally formed at the bottom portion of the flange 17b. The outside diameter of the flange 17b is larger than the inside diameter of the center hole 16a of the bracket 16. By the action of the biasing force F1 of the biasing means 15, the flange 17b is made to press-contact the top surface of the bracket 16, along the circumference of the center hole 16a. The cylindrical portion 17c extends below the bracket 16 through the center hole 16a.

A gap is formed between the peripheral portion of the center hole 16a of the bracket 16 and the bottom surface of the protrusion 14a provided at the clamping member 13. The gap is formed larger than the thickness of the flange 17b in the vertical direction. The rotation supporting member 17 can move slightly in the vertical direction inside the gap.

A clamper 18 is provided below the rotation supporting member 17. The clamper 18 may be formed of plastic or a sheet plate material and has a disc shape. The center portion of the clamper 18 is firmly secured to the inside portion of the cylindrical portion 17c of the rotation supporting member 17 by, for example, press-fitting, caulking, or bonding. The clamper 18 can rotate and move vertically integrally with the rotating supporting member 17. A downwardly protruding annular disc pushing portion 18a is formed at the outer peripheral area of the clamper 18. A centering fitting protrusion 18b extending in a conical shape towards a turntable is formed closer to the inner periphery of the clamper 18 than the disc pushing portion 18a.

A spindle motor 23 is provided on the drive chassis 20. A rotary shaft 23a of the spindle motor 23 extends above the drive chassis 20. A turntable 24 is secured to an end of the rotary shaft 23a. The turntable 24 may be formed of plastic, and includes a disc receiving portion 24a for supporting the disc D, a positioning protrusion 24b for insertion into a center hole D1 of the disc D, and a centering fitting recess 24c for fitting the fitting protrusion 18b of the clamper 18 thereto. The disc receiving portion 24a is provided at the outer peripheral portion of the turntable 24. The positioning protrusion 24b is formed towards the center of the turntable 24. The centering fitting recess 24c is formed inwardly of the positioning protrusion 24b.

As shown in FIGS. 1 and 2, bent portions 13a that are bent in a direction in which they come close to the drive chassis 20 are formed at one end of the clamping member 13 in the widthwise direction (X1–X2 direction) thereof, that is, at the X1-direction end portion of the clamping member 13. The drive chassis 20 includes supporting portions 20a that are formed slightly inwardly of the corresponding bent portions 13a. The supporting portions 20a are bent in a direction in which they come close to the clamping member 13. The lengths of the supporting portions 20a in the height direction thereof are greater than the lengths of the bent portions 13a in the height direction thereof, and, as shown in FIG. 1, an end portion 25 of each supporting portion 20a is in contact with the bottom surface of the clamping member 13. The points of contact of the end portions 25 and the clamping member 13 are supporting fulcra 51 for the clamping member 13.

As shown in FIG. 2, two bent portions 13a and two supporting portions 20a are formed so as to be spaced apart from each other in the Y direction. Therefore, there are also two supporting fulcra 51. Both supporting fulcra 51 are positioned outwardly of the outer periphery of the disc D set on the turntable 24. More specifically, a lateral distance La (in the X1 direction) between the two supporting fulcra 51 and 51 and a rotational center O—O of the turntable 24 is greater than the radius of the disc D. Therefore, the disc D that is supplied towards the back side of the plane of the sheet of FIG. 1 (Y1 direction) does not come into contact with the supporting portions 20a.

Figure 3:
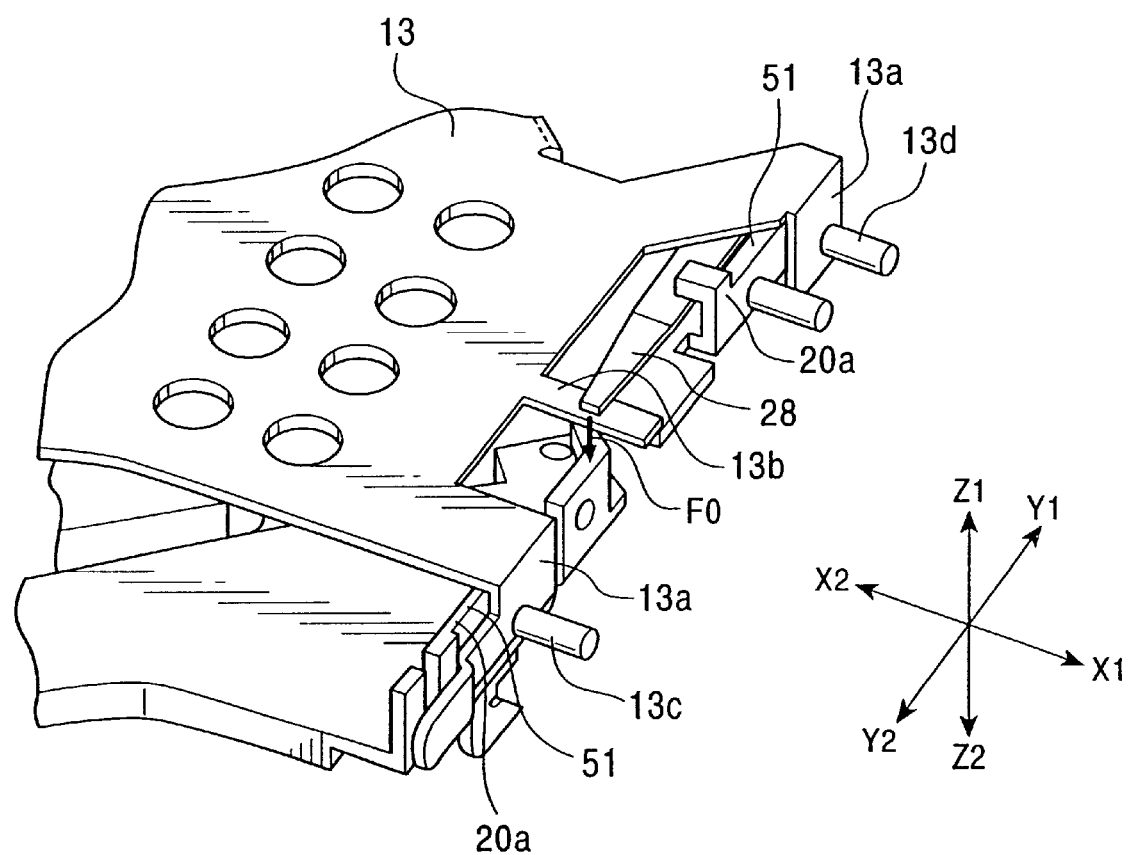
FIG. 3 is a perspective view of a portion of FIG. 2, showing another form of a holding elastic member.

As shown in FIG. 2, a retainer 13b is formed at the X1-side side portion of the clamping member 13 so as to protrude between the bent portions 13a and 13a. The drive chassis 20 includes a protruding retainer 20b opposing the retainer 13b. A holding elastic member 26 is provided between the retainer 13b and the retainer 20b. The holding elastic member 26 is a coil spring that is hooked on the retainer 13b and the retainer 20b while the holding elastic member 26 is stretched by a predetermined amount from its free length. Therefore, by a contraction elastic force F0 of the holding elastic member 26, the X1-side end portion of the clamping member 13 is, at the supporting fulcra 51, urged against the end portions 25 of the supporting portions 20a. Alternatively, as shown in FIG. 3, a plate spring 28 may be mounted to the bottom surface of the clamping member 13 in order to bias the retainer 13b in the illustrated Z2 direction by a biasing force F0 of the plate spring 28.

The holding elastic member 26 may be positioned outwardly of the supporting fulcra 51 as shown in FIG. 1, or inwardly of the supporting fulcra 51 (closer to the turntable 24). A point upon which the contraction elastic force F0 of the holding elastic member 26 acts and the supporting fulcra 51 may be positioned so as to line up in one row in the Y direction.

A clamping elastic member 27 is provided at the other end portions (X2-direction end portions) of the clamping member 13 and the chassis 20. The clamping elastic member 27 is a coil spring, and is hooked, at the other end portions, between the clamping member 13 and the drive chassis 20 while the clamping elastic member 27 is stretched by a predetermined amount from its free length. A contraction elastic force F2 of the clamping elastic member 27 acts in the direction in which the clamping member 13 and the drive chassis 20 move closer to each other. The clamping elastic member 27 is positioned outwardly of the outer periphery of the disc D set on the turntable 24. More specifically, in FIG. 1, the distance between the rotational center O—O of the turntable 24 and a force acting portion 52 upon which a clamping elastic force (contraction elastic force F2) applied to the clamping member 13 from the clamping elastic member 27 acts is greater than the radius of the disc D. Therefore, the disc D that is supplied in the Y1 direction and the clamping elastic member 27 do not contact each other.

As shown in FIGS. 1 and 2, movable members 30 and 40, which are unclamping means, are provided so that the movable member 30 is provided at the X1 side portions of the clamping member 13 and the drive chassis 20 and the movable member 40 is provided at the X2 side portions of the clamping member 13 and the drive chassis 20. The power of, for example, a motor synchronizes the movable members 30 and 40 and drives them in the Y1–Y2 directions.

The movable member 30 includes cam grooves 31 and 32 for an unclamping operation, and a cam groove 33 for a locking operation. Releasing pins 13c and 13d affixed to the bent portions 13a of the clamping member 13 are inserted in the cam grooves 31 and 32, respectively. A supporting pin 20c affixed to one of the supporting portions 20a of the drive chassis 20 is inserted in the cam groove 33.

The movable member 40 includes a cam groove 41 for an unclamping operation and a cam groove 42 for a locking operation. A releasing pin 13e affixed to the clamping member 13 is inserted in the cam groove 41, and a supporting pin (not shown) affixed to the drive chassis 20 is inserted in the cam groove 42.

Unclamping guiding portions 31a, 32a, and 41a extending obliquely upward in the Y2 direction are formed in the cam grooves 31, 32, and 41 for unclamping operations, respectively. Free holes 31b, 32b, and 41b having opening sizes that are sufficiently larger than the diameters of their corresponding releasing pins 13c, 13d, and 13e are formed at the Y1 side of their respective cam grooves. The locking cam grooves 33 and 42 include corresponding lock guide portions 33a and 42a extending in the Y2 direction, and corresponding free holes 33b and 42b positioned at the Y1 side.

Although not shown, a decorative panel is provided forwardly of the housing 12 in the illustrated Y2 direction. An entry-and-exit slot for inserting the disc D into the disc device 11 is formed in the decorative panel. Disc transporting means for transporting the disc D between the entry-and-exit slot and the turntable 24 is provided inwardly of the decorative panel. Pickup means 50 having an objective lens mounted there on and a sled mechanism for moving the pickup means 50 in the radial direction of the disc D are mounted on the drive chassis 20.

Next, the operation of the disc device will be described.

Before the disc D is inserted, the movable members 30 and 40 are moved in the illustrated Y1 direction by driving means (not shown). At this time, the releasing pins 13c and 13d and the releasing pin 13e that extend from the clamping member 13 are guided by the unclamping guide portions 31a and 32a of the corresponding cam grooves 31 and 32 and the unclamping guide portion 41a of the cam groove 41, respectively. Therefore, at both the X1-side and the X2-side side portions of the clamping member 13, the clamping member 13 is lifted in a direction in which it moves away from the drive chassis 20. In the lifted state, the clamping member 13 is separated from the end portions 25 of the supporting portions 20a, and is in a posture substantially parallel to the drive chassis 20.

When the clamping member 13 is lifted from the drive chassis 20, as shown in FIG. 4, the clamper 18 moves away upward from the turntable 24, and is, thus, in a disc unclamping state, causing a gap S for inserting the disc D to be formed between the clamper 18 and the turntable 24.

At this time, by the action of the pushing portion 15b of the biasing means 15 provided on the clamping member 13, the biasing force F1 pushes the push portion 17a of the rotation supporting member 17 downward, so that the flange 17b is pushed against the top surface of the bracket 16, along the circumference of the center hole 16a, thereby placing constraints on the rotation supporting member 17 by preventing upward and downward movement of the rotation supporting member 17. Therefore, even if an external vibration, such as vibration of a vehicle body, acts, the rotation supporting member 17 does not rattle in the vertical direction, thereby making it possible to prevent the occurrence of rattle noise.

The supporting pins 20c of the drive chassis 20 are held inside the lock guide portion 33a of the cam groove 33 of the movable member 30 and the lock guide portion 42a of the cam groove 42 of the movable member 40, respectively, so that the drive chassis 20 is constrained in a locked state that prevents the drive chassis 20 from moving. In other words, the drive chassis 20 supported by the elastic supporting members 22 is locked so as not to move. Therefore, the disc D inserted from the entry-and-exit slot is reliably guided into the gap S between the turntable 24 and the clamper 18.

When the disc D is inserted from the entry-and-exit slot provided in the decorative panel, a disc transporting means (not shown) starts up in order to transport the disc D into the housing 12 by the disc transporting means and, then, into the gap S between the turntable 24 and the clamper 18. When the center hole D1 of the disc D coincides with the rotational center O—O of the turntable 24, the transportation of the disc D by the disc transporting means is stopped, and a constraining force of the disc transporting means on the disc D is removed, so that the disc D moves downward due to its own weight, causing the center hole D1 to be fitted to the outer periphery of the positioning protrusion 24b of the turntable 24. This causes the bottom surface of the disc D to be placed on the disc receiving portion 24a.

At this time, the movable members 30 and 40 are moved in the illustrated Y2 direction by the driving force of, for example, a motor (not shown). Here, the lifting forces of the unclamping guide portions 31a, 32a, and 41a on the corresponding releasing pins 13c, 13d, and 13e are removed. Therefore, the releasing pins 13c, 13d, and 13e move into the free holes 31b, 32b, and 41b of the cam grooves 31, 32, and 41, respectively, and are freed from the constraints of the movable members 30 and 40.

By the contraction elastic force F2 of the clamping elastic member 27 and the contraction elastic force F0 of the holding elastic member 26, the clamping member 13 is brought towards the drive chassis 20, so that the bottom surface of the clamping member 13 comes into contact with the end portions 25 of the supporting portions 20a. Then, as a result of the contraction elastic force F2 of the clamping elastic member 27, a disc clamping moment Mc around the supporting fulcra 51 acts on the clamping member 13. By the moment Mc, a downward clamping force Fx is produced with respect to the clamper 18, so that the disc D is pushed against the turntable 24 by the clam per 18.

At this time, the fitting protrusion 18b of the clamper 18 and the fitting recess 24c of the turntable 24 are fitted together, so that the turntable 24 and the clam per 18 are centered in order to clamp the disc D between the disc pushing portion 18a of the clamper 18 and the disc receiving portion 24a of the turntable 24.

As shown in FIG. 5, in the clamped state of the disc D, the pushing portion 15b of the biasing means 15 is in close contact with the bottom surface of the protrusion 14a provided in the clamping member 13, and the push portion (pivot) 17a at the top surface of the rotation supporting member 17 is in close contact with the bottom surface of the pushing portion 15b. The point of contact of the bottom surface of the pushing portion 15b of the biasing means 15 and the push portion 17a is a clamping force acting portion 53. At the clamping force acting portion 53, the downward clamping force Fx acts on the clamper 18 from the clamping member 13.

With the clamper 18 pushing the disc D against the turntable 24 by the clamping force Fx, the flange 17b of the rotation supporting member 17 moves away from the top surface of the bracket 16, thereby making it possible for the clamper 18 to rotate upon the clamping force acting portion 53 as a fulcrum.

The supporting pins 20c provided at the drive chassis 20 move into the free hole 33b of the cam groove 33 of the movable member 30 and the free hole 42b of the cam groove 42 of the movable member 40, respectively, so that the constraining force of the movable members 30 and 40 on the drive chassis 20 is removed. Therefore, in the housing 12, the drive chassis 20 is brought into an elastically raised position by the elastic supporting members 22. The releasing pins 13c, 13d, and 13e provided on the clamping member 13 are positioned inside the free holes 31b, 32b, and 41b of the corresponding cam grooves 31, 32, and 41, respectively. In this state, the clamping member 13 and the drive chassis 20 are integrally coupled as a result of being brought close together by the contraction elastic forces of the clamping elastic member 27 and the holding elastic member 26.

Therefore, with the drive chassis 20 and the clamper 18 being integrally coupled, the drive chassis 20 is brought into an elastically raised state by the elastic supporting members 22, and, thus, is in a state that is not directly affected by external vibration, such as the vibration of the vehicle body.

Here, in the clamped state of the disc D shown in FIG. 1, when the distance from the supporting fulcra 51 to the force acting portion 52 upon which the contraction elastic force F2 (biasing force) of the clamping elastic member 27 acts is Lb, the disc clamping moment Mc is equal to F2×Lb. When the distance from the supporting fulcra 51 to the clamping force acting portion 53 is La, the clamping force Fx that acts on the clamper 18 is equal to F2×(Lb/La).

Therefore, the contraction elastic force F2 of the clamping elastic member 27 may be less than the clamping force Fx required to cause the clamper 18 to push the disc D against the turntable 24. The supporting fulcra 51 and the contraction elastic force F2 acting portion 52 are positioned outwardly of the outer periphery of the disc D set on the turntable 24. Since the aforementioned La is longer than the radius of the disc D, and the aforementioned Lb is larger than the diameter of the disc D, the aforementioned Lb/La is approximately equal to 2. Therefore, when the clamping force Fx acting on the clamping force acting portion 53 is to be 3 N, the contraction elastic force F2 of the clamping elastic member 27 is large enough when it is approximately 1.5 N.

When the disc D is clamped, the contraction elastic force F0 of the holding elastic member 26 is large enough when it does not allow the clamping member 13 and the drive chassis 20 to move away from each other at the supporting fulcra 51. Therefore, the contraction elastic force F0 can be a small value that is equal to or less than 1.5 N. Accordingly, the clamping elastic member 27 and the holding elastic member 26 may be relatively weak springs, so that a large localized elastic force no longer acts on the clamping member 13.

When the disc D is unclamped, the releasing pins 13c, 13d, and 13e provided on the clamping member 13 are raised by the movable members 30 and 40, so that the portions of contact of the movable member 30 and the releasing pins 13c and 13d are unclamping force acting portions 54, and the portion of contact of the movable member 40 and the releasing pin 13e is an unclamping force acting portion 55. When the disc D is unclamped, the sum of the upward unclamping force applied to the unclamping force acting portion 54 and the unclamping force applied to the unclamping force acting portion 55 may be a value greater than F0+F2.

For example, in the case where the disc D is clamped as shown in FIG. 1, when the contraction elastic force F2 of the clamping elastic member 27 and the contraction elastic force of the holding elastic member 26 are 1.5 N, the lifting forces that must be applied to the unclamping force acting portions 54 and 55 to unclamp the disc D may be equal to or greater than 1.5 N.

Therefore, the load that is produced when the movable members 30 and 40 move in the Y1 direction when unclamping the disc D is very small, so that power can be reduced. The sliding load that is produced when the releasing pins 13c, 13d, and 13e slide in the corresponding cam grooves 31, 32 and 41 when the movable members 30 and 40 move becomes small, so that frictional force is reduced, thereby reducing the occurrence of wearing caused by the sliding.

In the clamped state of the disc D shown in FIG. 5, the clamping force Fx acts on the rotation supporting member 17 from the clamping member 13. The biasing means 15, which is a plate spring, provided at the clamping member 13, is provided only for the purpose of preventing rattling of the rotation supporting member 17 and the clamper 18 when the disc D is in the unclamped state shown in FIG. 4. Therefore, the biasing force F1 exerted on the rotation supporting member 17 from the biasing means 15 is set within a range that does not cause rattling resulting from vibration, so that no problems arise even if the biasing means 15 is one having a weak elastic force.

However, in a modification of the present invention, the biasing means 15 may be one pushing the clamper 18 towards the turntable 24 by the biasing force F1 thereof when the disc D is in the clamped state shown in FIG. 5. In this case, the biasing force F1 exerted on the rotation supporting member 17 from the biasing means 15 when the disc D is an the clamped state is the clamping force Fx of the clamper 18. Also in this case, F2=Fx×(La/Lb).

In another modification, when the movable member 40, which is the unclamping means, is provided only at the X2 side, and the disc D is to be unclamped, only the X2-side side portion of the clamping member 13 may be lifted by the movable member 40 or by another lifting mechanism (meaning that the X1-side side portion of the clamping member 13 is not lifted). In this case, when the disc D is in the unclamped state, the clamping 13 assumes an oblique posture resulting from the clockwise rotation of the clamping member 13 upon the supporting fulcra 51 while the clamping member 13 remains in contact with the supporting portions 20 at the supporting fulcra 51. Also in this case, the lifting force that should be exerted on the unclamping force acting portion 55 with respect to the clamping member 13 may be equal to or greater than 1.5 N. In addition, in a modification in which the clamping member 13 rotates obliquely clockwise with the supporting fulcra 51 as centers when the disc D is in the unclamped state, the clamping member 13 may be supported at the supporting fulcra 51 provided at the drive chassis 20 by a supporting shaft so as to be rotatable to a greater degree.

However, as in the above-described embodiment, when there is used a structure in which, when the disc D is in the unclamped state, the clamping member 13 is lifted while being parallel or substantially parallel to the drive chassis 20, the space required to lift the clamping member 13 inside the housing 12 when the disc D is to be unclamped can be made small, so that it becomes easier to construct a thin disc device.

Figure 6:
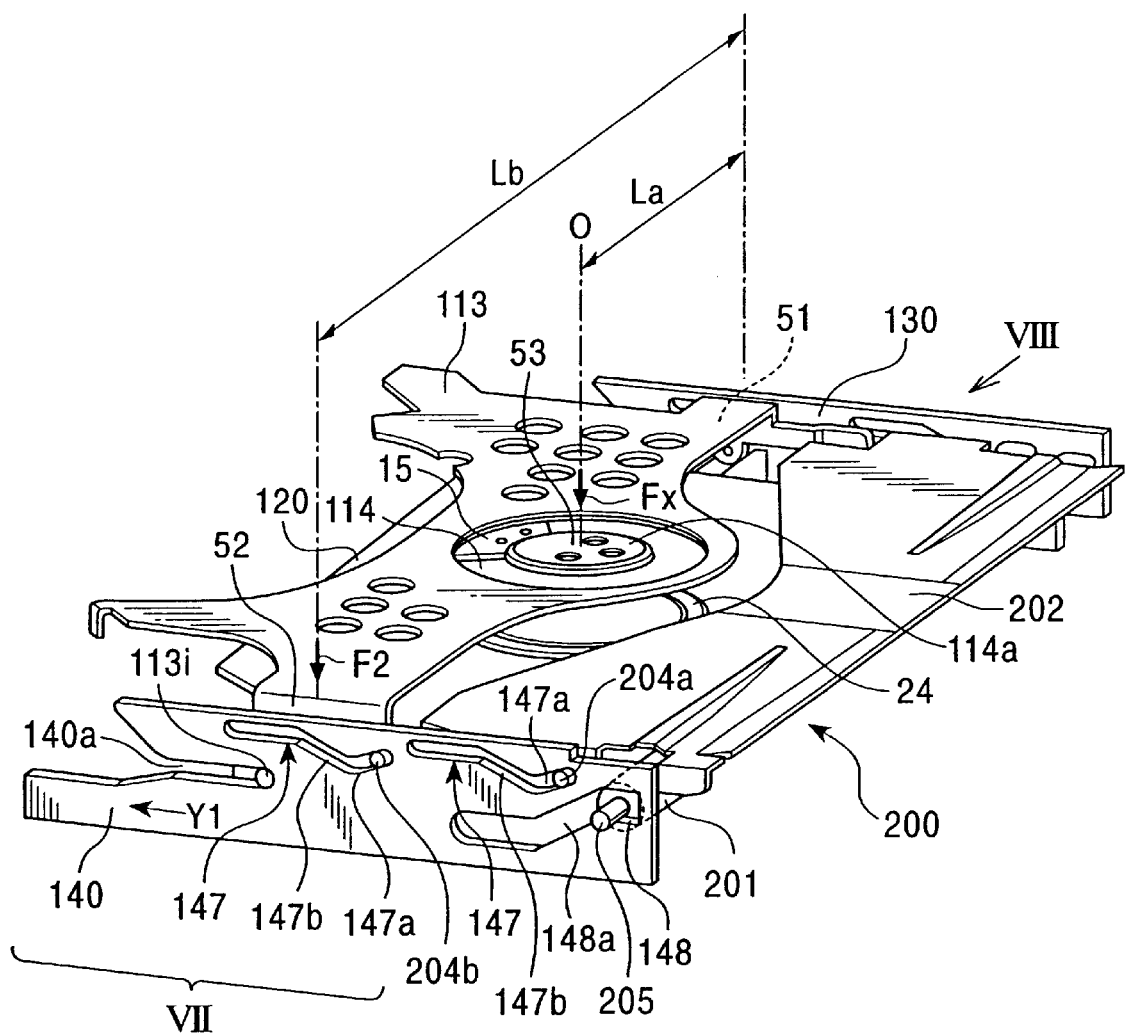
FIG. 6 is a perspective view of the main portion of a disc device of a second embodiment of the present invention.

A second embodiment of the present invention will be described by reference to FIGS. 6–12. FIG. 6 is a perspective view of the main portion of a disc device of the second embodiment.

Figure 10:
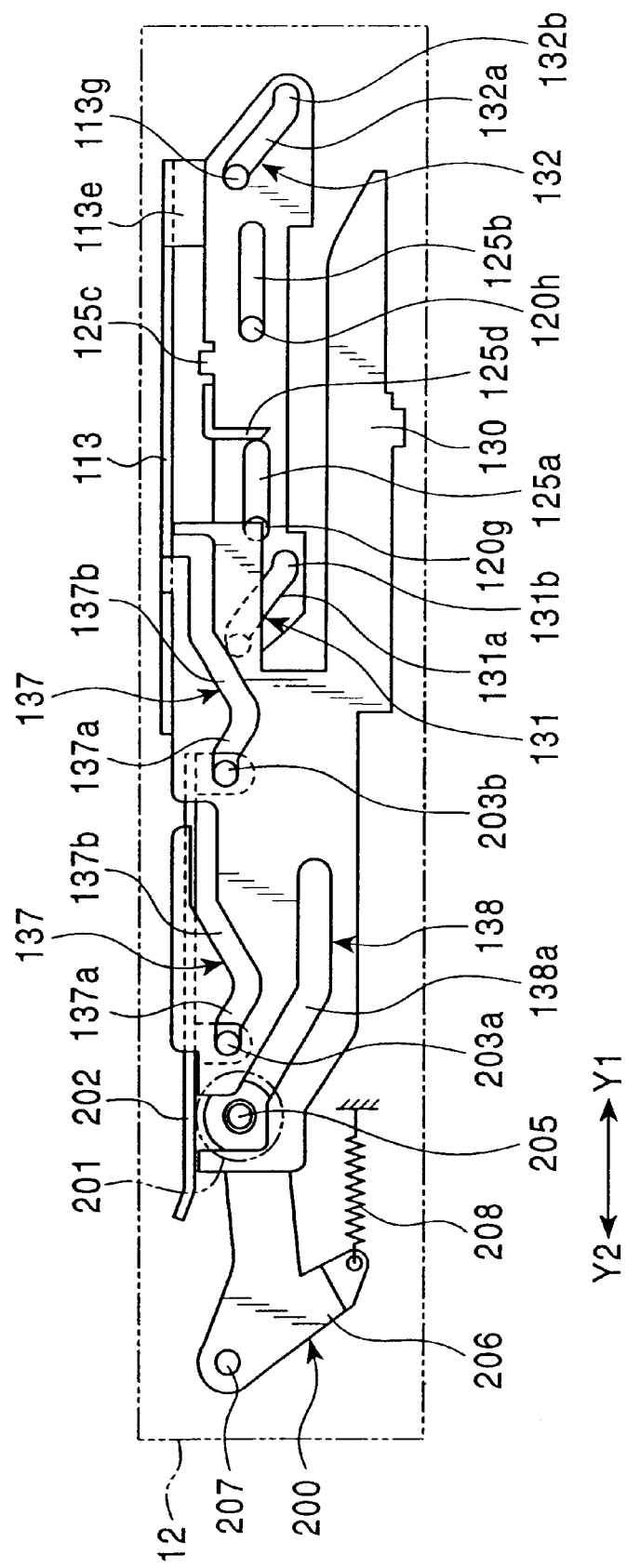
FIG. 10 is a side view taken along arrow VIII, showing a disc insertion waiting state.
Figure 11:
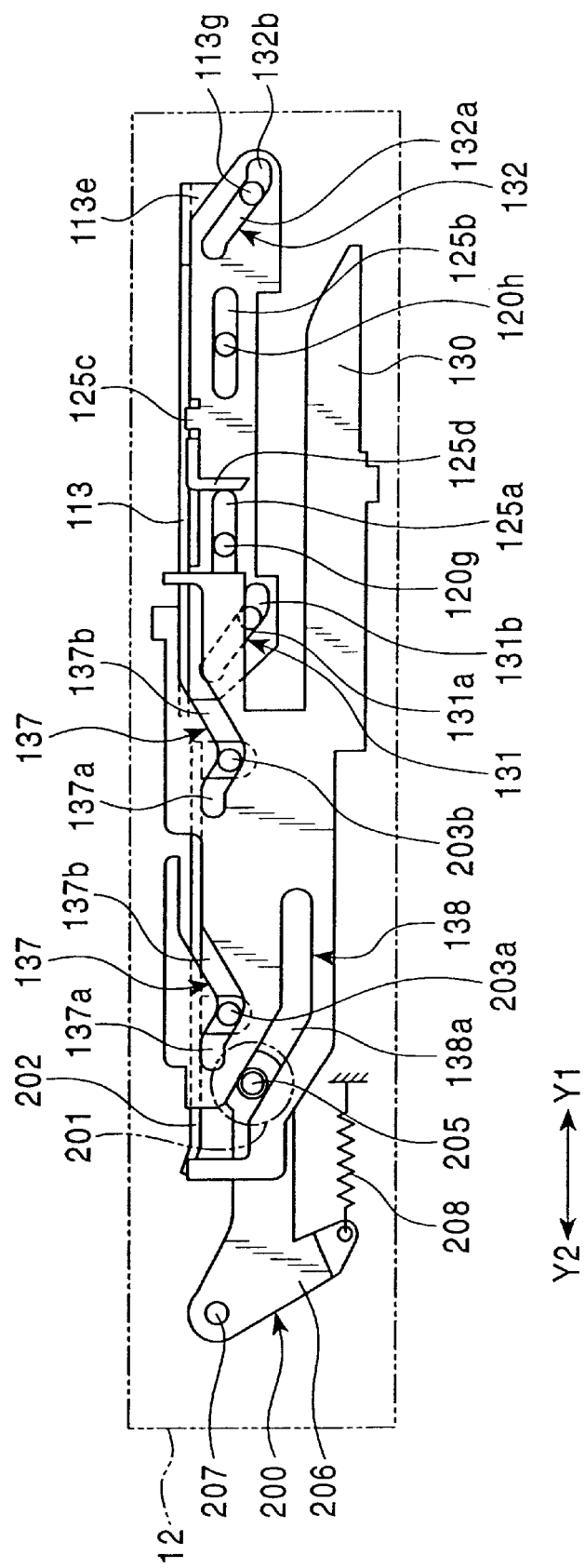
FIG. 11 is a side view taken along the arrow VIII, showing a state during transition to a disc clamping operation.
Figure 12:
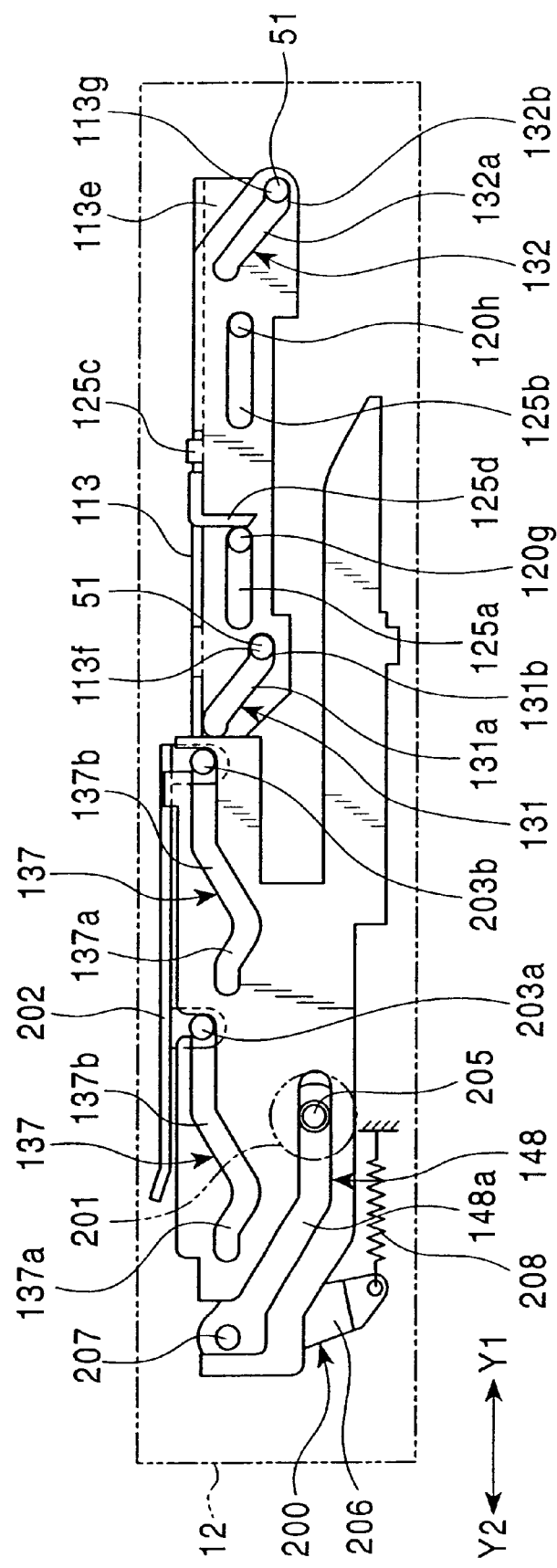
FIG. 12 is a side view taken along the arrow VIII, showing a disc clamp completion state.

A drive chassis 120 used in the disc device of the second embodiment is formed by bending a sheet plate material. As in the first embodiment shown in FIG. 1, the drive chassis 120 is supported in an elastically raised state at an inside portion of a housing 12 by elastic supporting members 22, such as coil springs or clamper members. FIGS. 10, 11, and 12 are side views of the housing 12.

A turntable 24 and a spindle motor 23 for rotationally driving the turntable 24, which have the same structures as those shown in FIGS. 4 and 5, are provided on the drive chassis 120. A clamping member 113, formed of a sheet plate material, is provided above the drive chassis 120. As in the embodiment shown in FIGS. 2 to 4, a depression 114 and a protrusion 114a that protrudes at the center portion of the depression 114 are also formed in the clamping member 113. Biasing means 15, which is a plate spring, is secured to the depression 114. A bracket 16, a rotation supporting member 17, and a clamper 18, which have the same structures as those shown in FIGS. 4 and 5, are provided below the depression 114.

Figure 7:
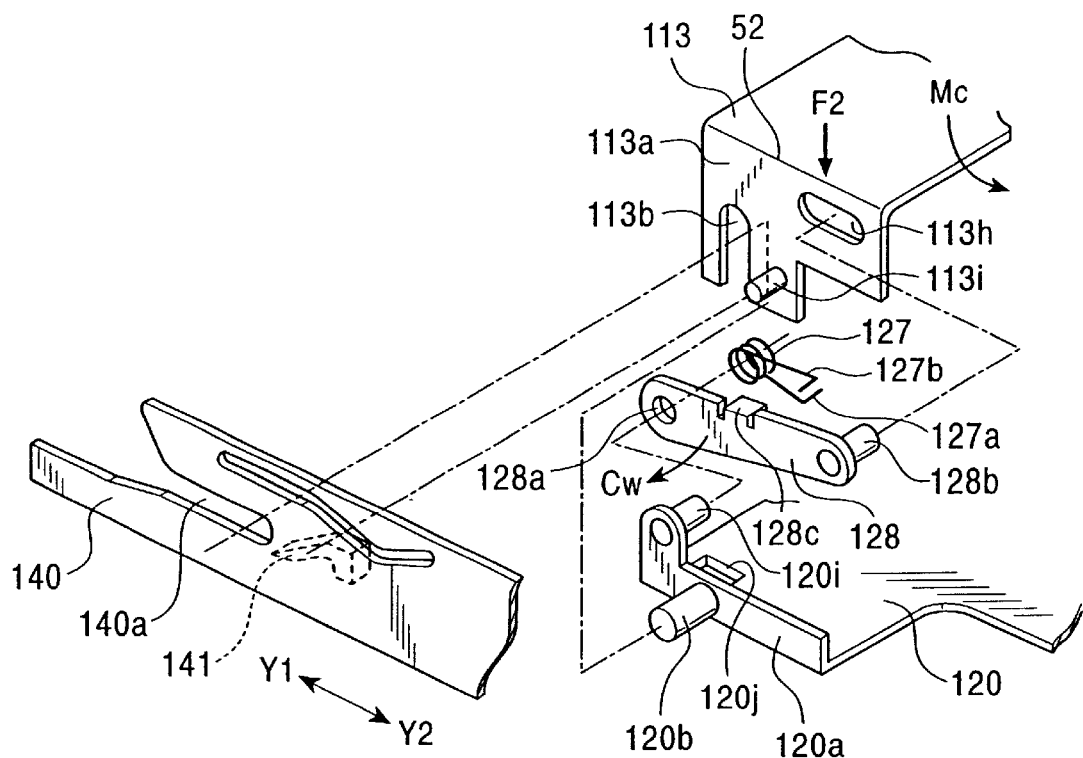
FIG. 7 is an exploded perspective view of a portion represented by VII in FIG. 6.
Figure 9:
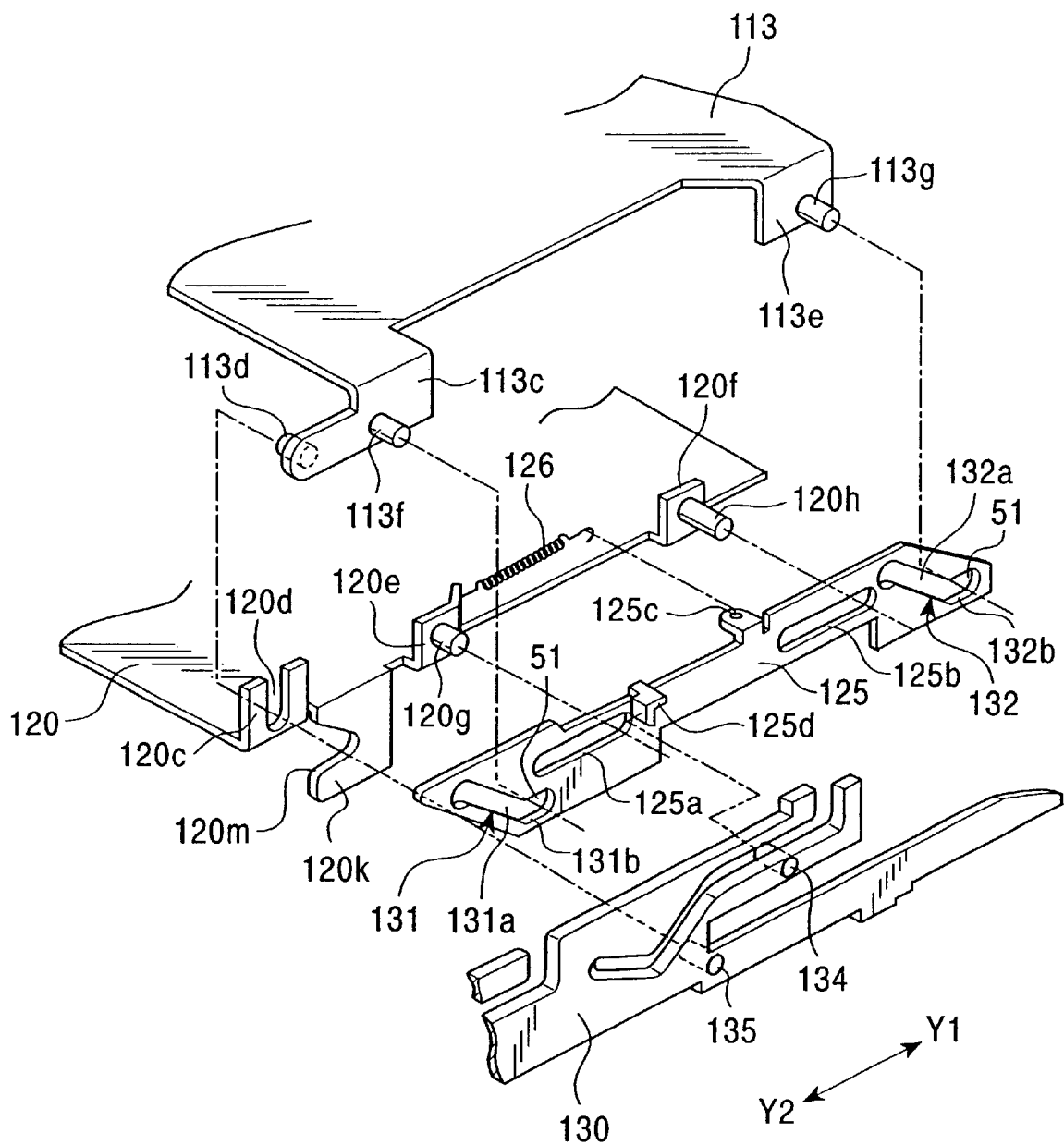
FIG. 9 is an exploded perspective view of portion IX of FIG. 8.

As shown in FIG. 7, a bent portion 120a, formed by upwardly bending a portion of the drive chassis 120, is provided at the illustrated left side portion of the drive chassis 120. A guide pin 120b is attached to the outside surface of the bent portion 120a. A downwardly facing bent portion 113a is provided at the left side portion of the clamping member 113. A perpendicular guide groove 113b is formed in the bent portion 113a. As shown in FIG. 9, an upwardly extending bent portion 120c is formed at the illustrated right side portion of the drive chassis 120. A vertically extending guide groove 120d is formed in the bent portion 120c. A downwardly facing bent portion 113c is formed at the right side portion of the clamping member 113. A guide pin 113d is attached to the inside of the bent portion 113c.

When, as shown in FIG. 7, the guide groove 113b of the clamping member 113 is fitted over the guide pin 120b, and when, as shown in FIG. 9, the guide pin 113d provided at the clamping member 113 is inserted into the guide groove 120d, the clamping member 113 is fitted to the drive chassis 120 so as to freely move upward and downward towards and away from the drive chassis 120 while the clamping member 13 is in a posture parallel to the drive chassis 120.

Figure 8:
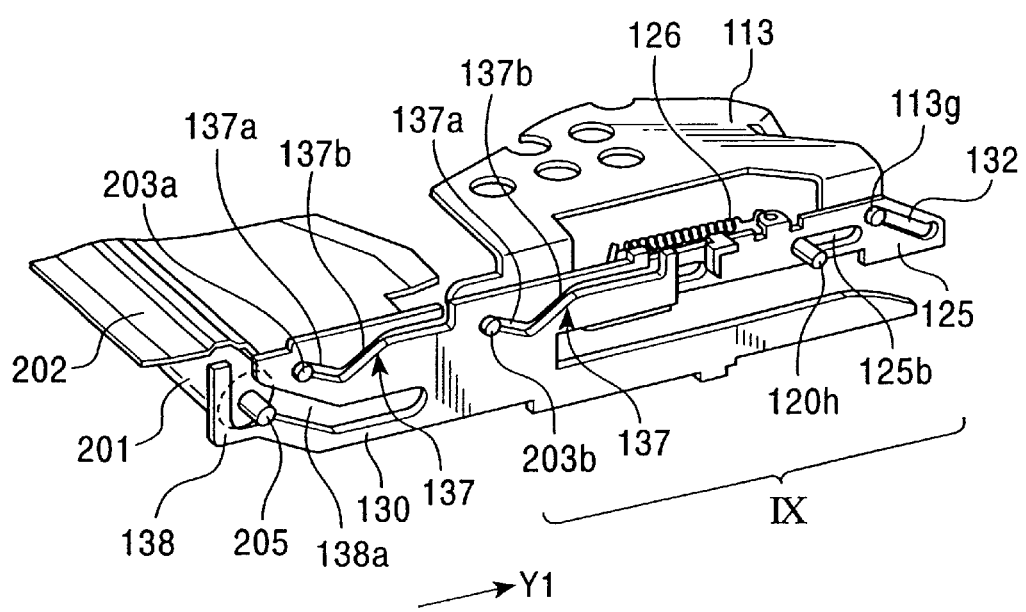
FIG. 8 is a side view taken along arrow VIII of FIG. 6.

In the second embodiment, as in the first embodiment shown in FIGS. 1 and 2, the side portions shown in FIGS. 8 and 9 correspond to supporting sides that serve as fulcra for a disc clamping moment that acts on the clamping member 113.

As shown in FIG. 9, a bent portion 113e, along with the bent portion 113c, is integrally bent downward at the right side portion of the clamping member 113. Supporting portions 113f and 113g, formed using securing pins, are attached to the bent portions 113c and 113e, respectively. Bent portions 120e and 120f are provided at the illustrated right side of the drive chassis 120. Guide pins 120g and 120h are attached to the bent portions 120e and 120f, respectively.

As shown in FIG. 9 and FIGS. 10 to 12, a driving member 125 is provided at the outer surfaces of the bent portions 120e and 120f. Slots 125a and 125b extending in the Y1–Y2 directions are formed in the driving member 125. The slots 125a and 125b are fitted onto the guide pins 120g and 120h, respectively, in order to support the driving member 125 so as to be movable in straight lines in the Y1–Y2 directions at the side portion of the drive chassis 120. A holding elastic member 126, which is an extension coil spring, is hooked between the bent portion 120e of the drive chassis 120 and the bent portion 125c of the driving member 125. By the holding elastic member 126, the driving member 125 is biased in the Y2 direction at all times.

Cam grooves 131 and 132 are formed in the driving member 125. The supporting portions 113f and 113g of the clamping member 113 are inserted into the cam grooves 131 and 132, respectively. An unclamping guide portion 131a and a support hole 131b are formed in the cam groove 131. An unclamping guide portion 132a and a support hole 132b are formed in the cam groove 132. The unclamping guide portions 131a and 132a extend obliquely upward as they extend in the Y2 direction. The support holes 131b and 132b extend a short distance in the Y1 direction at Y1-side terminal ends of the corresponding unclamping guide portions 131a and 132a.

As shown in FIG. 9 and FIGS. 10 to 12, a movable member 130 is provided at the inside portion of the housing 12 so as to be movable in the Y1–Y2 directions, and is driven in the Y1 direction and the Y2 direction by driving means (not shown). A releasing protrusion 134 is provided at the inside surface of the movable member 130, and opposes a push portion 125d that is a bent portion of the driving member 125.

In the second embodiment, unclamping means is formed by the movable member 130 and the driving member 125, at the right portions of the drive chassis 120 and the clamping member 113.

As shown in FIG. 7, at the illustrated left side portion of the drive chassis 120 and the clamping member 113, a supporting pin 120i is attached to the inside surface of the bent portion 120a of the drive chassis 120. An intermediate member 128 is provided at the inside of the bent portion 120a. A hole 128a that is formed in the base end portion of the intermediate member 128 is rotatably supported by the supporting pin 120i. A clamping biasing pin 128b is attached to the distal end of the intermediate member 128, and is inserted into a biasing slot 113h that is formed in the bent portion 113a of the clamping member 113.

A clamping elastic member 127, which is a torsion spring, is mounted to the supporting pin 120i. One arm 127a of the clamping elastic member 127 is retained by a notch 120j of the drive chassis 120, while the other arm 127b is hooked to a retainer portion 128c that is formed by bending a portion of the intermediate member 128. By the action of a biasing force of the clamping elastic member 127, the intermediate member 128 is biased in a clockwise direction CW in FIG. 7, and, by this biasing force, the bent portion 113a of the clamping member 113 is biased towards the drive chassis 120 (towards the turntable 24) at all times. An elastic force F2 functions in the same way as the contraction elastic force F2 shown in FIG. 1, and acts upon a force acting portion 52 of the bent portion 113a. By the action of the elastic force F2 that acts upon the force acting portion 52, a disc clamping moment Mc is applied to the clamping member 113.

A movable member 140 shown in FIG. 7 is supported at the inside portion of the housing 12 so as to be movable in the Y1–Y2 directions. The movable member 140 is driven in the Y1–Y2 directions in synchronism with the movable member 130.

A releasing protrusion 141 having a surface that gradually tilts upward from the Y1 side to the Y2 side is provided at the inside surface of the movable member 140. The releasing protrusion 141 opposes a push pin 113i (which is pushed) attached to the bent portion 113a of the clamping member 113.

In the second embodiment, by the action of the movable members 130 and 140 that form the unclamping means, the locking and unlocking operations of the drive chassis 120 and a controlling operation of the position of the disc transfer means are performed.

As shown in FIG. 9, a downwardly facing bent portion 120k is formed at the right side portion of the drive chassis 120. A lock groove 120m that opens in a V shape in the Y2 direction is formed in the bent portion 120k. lock pin (lock protrusion) 135 that fits into the lock groove 120m is provided on the inside surface of the movable member 130.

As shown in FIG. 7, at the left side portion of the drive chassis 120, the guide pin 120b provided at the bent portion 120a of the drive chassis 120 functions as a lock pin. A lock groove 140a is formed in the movable member 140. The guide pin 120b and the lock groove 140a can be freely fitted to each other.

As shown in FIG. 9, when the lock pin 135 is fitted to the lock groove 120m as a result of the movable member 130 moving in the Y1 direction, and, as shown in FIG. 7, when the guide pin 120b is fitted into the lock groove 140a as a result of the movable member 140 moving in the Y1 direction, the drive chassis 120 is brought into a locked state inside the housing 12. On the other hand, when the movable members 130 and 140 both move in the Y2 direction, disengagement occurs, so that the drive chassis 120 is supported by the elastic supporting members 22 in an elastically raised state inside the housing 12.

As shown in FIG. 6 and FIGS. 10 to 12, disc transfer means 200 is disposed between the turntable 24 and an entry-and-exit opening that is provided in a decorative panel. The disc transfer means 200 includes a transfer roller 201 and a sliding member 202 formed above the transfer roller 201 and formed of a material having a small coefficient of friction such as synthetic resin.

The sliding member 202 is guided so as to be vertically movable by guiding means (not shown) that is provided on the drive chassis 120. As shown in FIG. 8 and FIGS. 10 to 12, protrusions 203a and 203b are attached to the right side portion of the sliding member 202, and are slidably inserted in corresponding control slots 137 and 137 of the movable member 130.

Similarly, as shown in FIG. 6, protrusions 204a and 204b are integrally formed at the left side portion of the sliding member 202, and are slidably inserted in corresponding control slots 147 and 147 of the movable member 140.

The control slots 137 and 137 of the movable member 130 each include a downwardly inclined portion 137a and an upwardly inclined portion 137b. The control slots 147 and 147 of the movable member 140 each include a downwardly inclined portion 147a and an upwardly inclined portion 147b. The downwardly inclined portions 137a and the downwardly inclined portions 147a extend downward as they extend towards the drive chassis 120 in the Y1 direction. The upwardly inclined portions 137b and the upwardly inclined portions 147b gradually extend upward as they extend in the Y1 direction.

The transfer roller 201 is provided around the outer periphery of a roller shaft 205. As shown in FIGS. 10 to 12, the roller shaft 205 is supported by a rotary arm 206. By rotating the rotary arm 206 around a supporting shaft 207 as a fulcrum, the transfer roller 201 is movable vertically. A counterclockwise biasing force of a coil spring 208 acts upon the driving arm 206, so that the transfer roller 201 is biased upwards at all times.

A drive gear is provided at the roller shaft 205. Rotary power from a transfer motor (not shown) is transmitted after being reduced in value by the roller shaft 205.

As shown in FIG. 8 and FIGS. 10 to 12, a roller control slot 138 for vertically guiding the roller shaft 205 is formed in the movable member 130. As shown in FIG. 6, a roller control slot 148 for vertically guiding the roller shaft 205 is formed in the movable member 140. The roller control slots 138 and 148 include corresponding downwardly inclined portions 138a and 148a that extend downward as the downwardly inclined portions 138a and 148a extend in the Y1 direction.

Next, a description of the operation of the disc device of the second embodiment will be given.

FIGS. 6, 8, and 10 illustrate a disc D insertion waiting state.

In the waiting state, the movable members 130 and 140 are both moved in the Y1 direction. At the right side portion of FIG. 9, by the action of the releasing protrusion 134 provided on the movable member 130, the push portion 125d of the driving member 125 is pushed in the Y1 direction, so that the driving member 125 is moved in the Y1 direction against the biasing force of the holding elastic member 126. At this time, by the action of the unclamping guide portion 131a of the cam groove 131 and the unclamping guide portion 132a of the cam groove 132 of the driving member 125, the supporting portions 113f and 113g of the clamping member 113 are lifted.

On the other hand, at the left side portion of FIG. 7, the biasing force of the clamping elastic member 127 acts upon the bent portion 113a of the clamping member 113 through the intermediate member 128, so that the downward elastic force F2 acts upon the bent portion 113a (force acting portion 52) of the clamping member 113 at all times. However, when the movable member 140 moves in the Y1 direction, the push pin 113i that is provided on the bent portion 113a of the clamping member 113 is lifted by the inclined surface of the releasing protrusion 141 that is provided on the movable member 140.

As a result, the clamping member 113 is moved upward so as to move away from the drive chassis 120 while the clamping member 113 is kept in the posture parallel to the drive chassis 120. As in FIG. 4, the clamper 18 that is provided at the clamping member 113 moves away from the turntable 24 that is provided on the drive chassis 120.

The lock pin 135 that is provided on the movable member 130 shown in FIG. 9 is fitted into the lock groove 120m of the drive chassis 120, and the lock groove 140a of the movable member 140 shown in FIG. 7 is fitted onto the guide pin 120b that is provided on the drive chassis 120, so that the drive chassis 120 is in a locked state inside the housing 12.

As shown in FIGS. 6, 8, and 10, the sliding member 202 of the disc transfer means 200 is lifted by the control slots 137 and 137 of the movable member 130 and the control slots 147 and 147 of the movable member 140. The roller shaft 205 is positioned at the Y2-side edge of the roller control slot 138 and at the Y2-side edge of the roller control slot 148, so that the roller shaft 205 is in a state so as not to be restricted by the roller control holes 138 and 148. At this time, the roller shaft 205 is biased upward by the coil spring 208, so that the transfer roller 201 is elastically pushed against the bottom surface of the sliding member 202.

When a disc is inserted from the entry-and-exit slot of the decorative panel, the transfer motor starts to operate, so that the transfer roller 201 rotates. The rotation of the transfer roller 201 causes the disc to be sandwiched between the transfer roller 201 and the sliding member 202, so that, by the action of the rotary force of the transfer roller 201, the disc is supplied between the drive chassis 120 and the clamping member 113. At this time, by the action of the control slots 137 and the control slots 147, and by the roller control slot 138 and the roller control slot 148, the sliding member 202 and the transfer roller 201 are set at a high position, so that the disc D that is being transported is guided between the turntable 24 and the clamper 18 without striking a positioning protrusion 24b of the turntable 24.

When the center of a center hole D1 of the disc D coincides with the center of rotation of the turntable 24, the movable members 130 and 140 are both moved in the Y2 direction by driving means (not shown).

At the initial stage of movement of the movable members 130 and 140 in the Y2 direction, as shown in FIG. 11, the roller shaft 205 and the transfer roller 201 are moved downward by the downwardly inclined portions 138a and 148a of the corresponding roller control slots 138 and 148. At the same time, the sliding member 202 is temporarily moved downward by the downwardly inclined portions 137a and 137a of the corresponding control slots 137 and 137 and the downwardly inclined portions 147a and 147a of the corresponding control slots 147 and 147. Therefore, the disc D is pushed downward by the sliding member 202, so that the center hole D1 of the disc D is reliably fitted onto the positioning protrusion 24b of the turntable 24.

When the movable members 130 and 140 move in the Y2 direction, as shown in FIG. 12, the sliding member 202 is lifted by the upwardly inclined portions 137b and 137b of the corresponding control slots 137 and 137 and by the upwardly inclined portions 147b and 147b of the corresponding control slots 147 and 147, so that the sliding member 202 is separated upward from the disc D that is placed on the turntable 24. On the other hand, as shown in FIG. 12, the transfer roller 201 is pushed downward by the downwardly inclined portions 138a and 148a of the corresponding roller control slots 138 and 148, and is, thus, moved away from the disc D.

When the movable member 130 moves in the Y2 direction, the releasing protrusion 134 shown in FIG. 9 moves away from the push portion 125d of the driving member 125, so that the driving member 125 is moved in the Y2 direction by the elastic force of the holding elastic member 126. By the action of the cam grooves 131 and 132 of the driving member 125, the supporting portions 113f and 113g that are provided at the clamping member 113 are moved downward, and are, thus, held by the Y-side supporting holes 131b and 132b of the corresponding cam grooves 131 and 132.

On the other hand, when the movable member 140 moves in the Y2 direction, the releasing protrusion 141 shown in FIG. 7 moves away from the push pin 113i that is provided on the clamping member 113, so that the bent portion 113a of the clamping member 113 is freed from any restrictions by the movable member 140. Therefore, the elastic force of the clamping elastic member 127 is transmitted to the biasing slot 113h through the intermediate member 128 and the clamping biasing pin 128b, causing the downward elastic force F2 to act upon the bent portion 113a (force acting portion 52) of the clamping member 113.

As a result, at the right side portion, the point of contact of the top surface of the supporting portion 113f that is provided on the clamping member 113 shown in FIG. 9 and the top edge portion of the supporting hole 131b and the point of contact of the top surface of the supporting portion 113g that is provided on the clamping member 113 shown in FIG. 9 and the top edge portion of the supporting hole 132b become supporting fulcra 51 and 51, respectively. By the action of the elastic force F2, the disc clamping moment Mc acts with the supporting fulcra 51 and 51 as supporting points upon the clamping member 113. Owing to the disc clamping moment Mc, as shown in FIG. 1, a downward clamping force Fx acts upon the clamper 18, so that, by the action of the clamper 18, the disc D is pushed against the turntable 24.

Here, the positional relationship between the supporting fulcra 51, the force acting portion 52 upon which the elastic force F2 acts by the action of the clamping elastic member 127, and a clamper-18 clamping force acting portion 53 is the same as the positional relationship in the embodiment shown in FIG. 1. In other words, the distance from the supporting fulcra 51 to the elastic-force-F2 acting portion 52 is Lb, and the distance from the supporting fulcra 51 to the clamper-18 clamping force acting portion 53 is La, in which case the disc clamping force Fx is equal to F2×(Lb/La).

In the state in which the clamping of the disc D has been completed, when the movable member 130 moves in the Y2 direction, the lock pin 135 shown in FIG. 9 moves away from the lock groove 120m. Meanwhile, the lock groove 140a and the guide pin 120b, which are shown in FIG. 7, are disengaged from each other, so that the drive chassis 120 is unlocked, and is, thus, supported in an elastically raised state inside the housing 12. In the state in which the drive chassis 120 is supported in an elastically raised state, the turntable 24 is rotationally driven, so that the disc D is rotated. Then, a reproducing operation or a recording operation is performed.

When, after the driving of the disc D has been completed, the movable members 130 and 140 move in the Y1 direction, the driving member 125 shown in FIG. 9 is moved in the Y1 direction in order to lift the clamping member 113, and the releasing protrusion 141 shown in FIG. 7 lifts the push pin 113i, causing the clamping member 113 to be lifted, so that the disc D is unclamped. At this time, the location upon which an upward unclamping force that is applied to the push pin 113i by the releasing protrusion 141 shown in FIG. 7 acts is, like the location upon which the elastic force F2 acts, situated outwardly of the outer periphery of the disc D. Therefore, the force required to lift the push pin 113i can be very small compared to that conventionally required.

Figure 13:
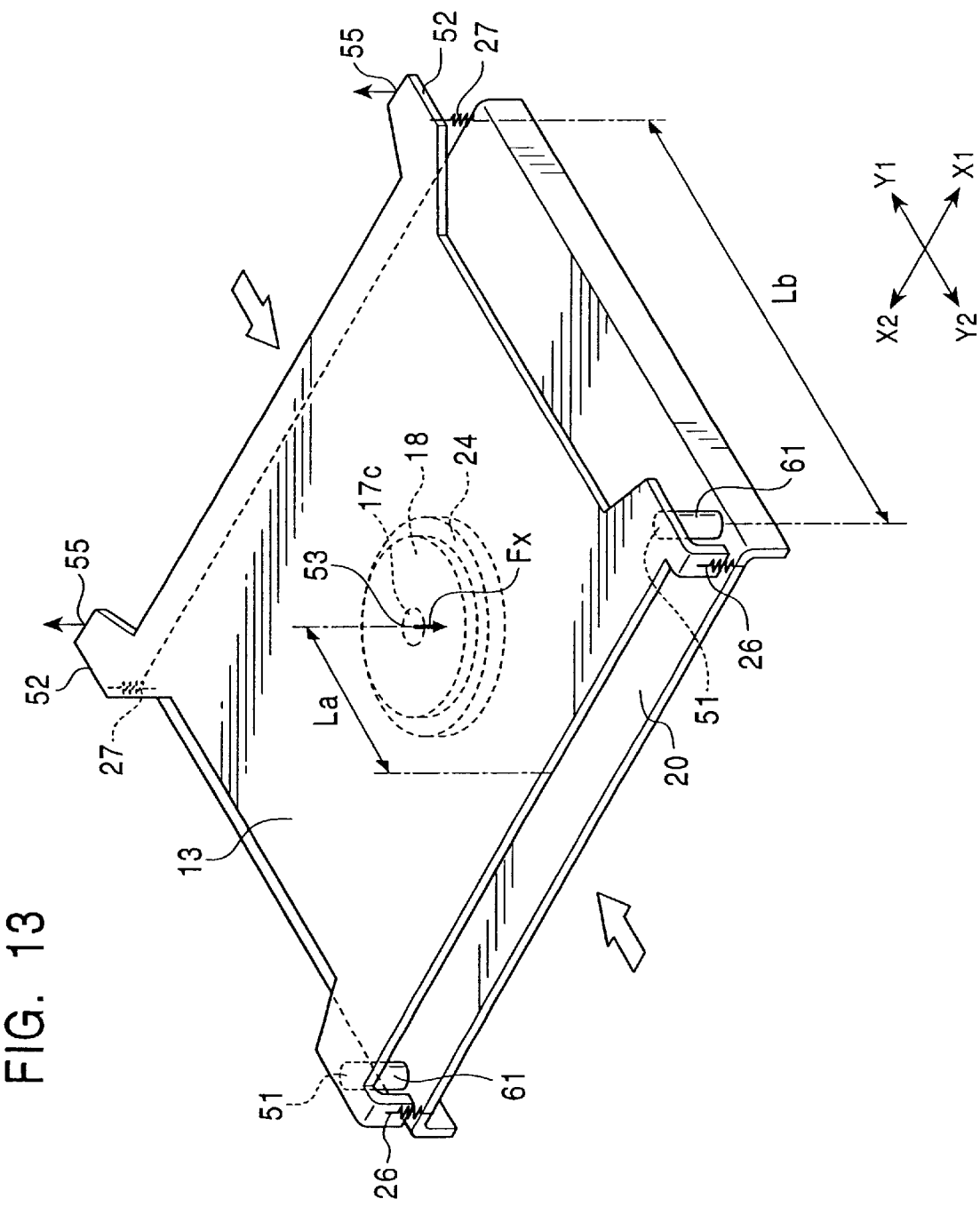
FIG. 13 is a perspective view of the main portion of a disc device of a third embodiment of the present invention.
Figure 14A:
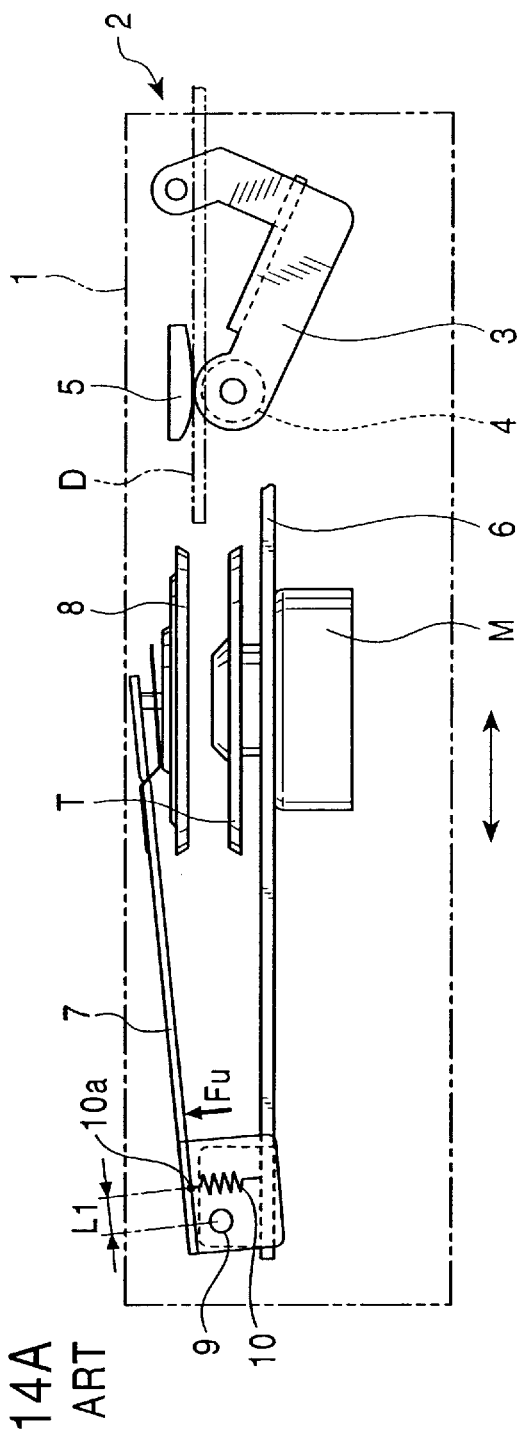
FIGS. 14A and 14B are side views showing a conventional disc device.
Figure 14B:
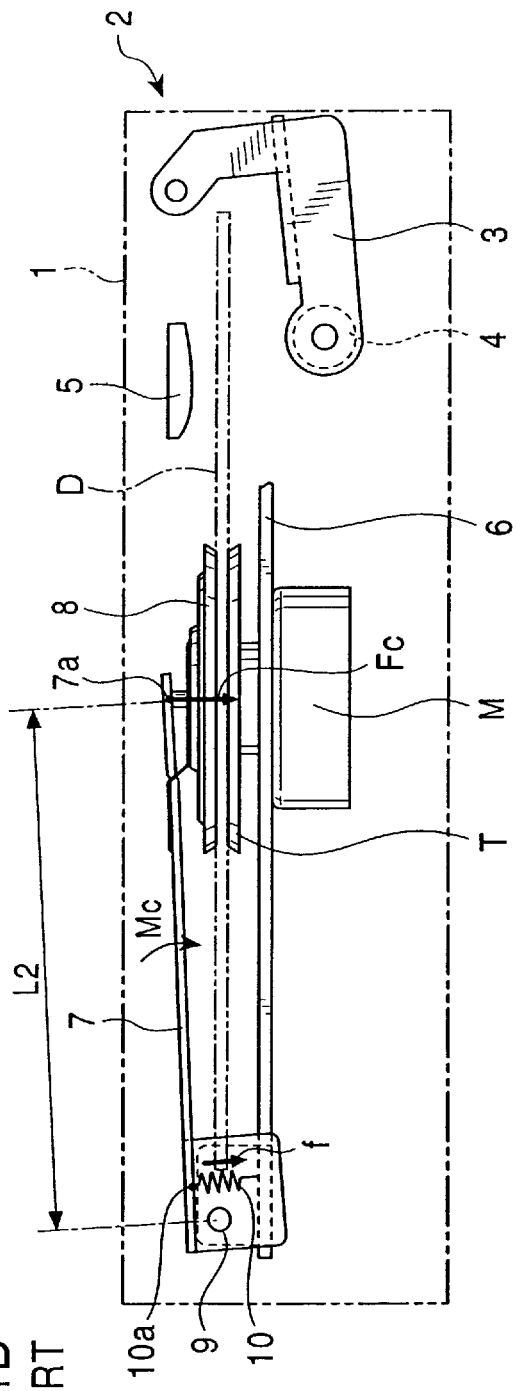

FIG. 13 is a perspective view schematically showing the structure of a disc device of a third embodiment of the present invention.

In the embodiment shown in FIG. 13, a pair of supporting fulcra 51 for the clamping member 13 and elastic force (biasing force) acting portions 52 of a pair of clamping elastic members 27 are rotated 90 degrees away with respect to the locations of the corresponding component parts used in the embodiment shown in FIGS. 1 and 2.

In the disc device shown in FIG. 13, the disc D is supplied between the drive chassis 20 and the clamping member 13 from the Y1 direction or the Y2 direction. At the Y2 side, a pair of pin-shaped supporting portions 61 and 61 are secured in an upward direction to the drive chassis 20. The bottom surface of the clamping member 13 is in contact with the top ends of the supporting portions 61 and 61 in order to form the pair of supporting fulcra 51 and 51. At the Y2 side, holding elastic members 26 and 26 are provided for biasing the drive chassis 20 and the clamping member 13 towards each other.

At the Y1 side, the pair of clamping elastic members 27 and 27 are provided between the drive chassis 20 and the clamping member 13. The portions 52 and 52 upon which the elastic forces of the pair of clamping elastic members 27 and 27 act are disposed on both the left and right sides of the clamping member 13. The distance between the supporting fulcra 51 and 51 in the X direction is greater than the diameter of the disc, and the distance between the portions 52 and 52 upon which the elastic forces of the clamping elastic members 27 and 27 act is also greater than the diameter of the disc. Therefore, the disc supplied between the drive chassis 20 and the clamping member 13 does not come into contact with the supporting portions 61 and 61, the holding elastic members 26 and 26, or the clamping elastic members 27 and 27.

Unclamping force (lifting force) acting portions 55 and 55 upon which unclamping forces applied to the clamping member 13 from unclamping means (not shown) act are provided at two Y1-side end portions. Here, the distance in the Y direction between the supporting fulcra 51 and the clamping force Fx acting portion 53 upon which the clamping force Fx applied to the clamper 18 acts is La, and the distance in the Y direction between the fulcra 51 and the elastic force acting portions 52 is Lb. When the clamping force Fx is 3 N, and Lb/La=2, the sum of the contraction elastic forces of the clamping elastic members 27 and 27 when the disc is clamped may be 1.5 N. Therefore, the contraction elastic force of one clamping elastic member 27 may be 0.75 N. Accordingly, when a plurality of clamping elastic members 27 are provided, the individual clamping elastic members 27 may be weak springs. This also applies to the embodiment shown in FIGS. 1 to 5, so that it is preferable to provide a plurality of clamping elastic members 27 in the disc device shown in FIGS. 1 to 5.

The sum of the forces exerted on the unclamping force acting portions 55 and 55 for unclamping the disc may be equal to or greater than 1.5 N, so that a lifting force exerted on one unclamping force acting portion 55 may be equal to or greater than 0.75 N.

In FIG. 13, the disc may be unclamped by rotating the clamping member 13 obliquely upward with the supporting fulcra 51 as centers. However, the clamping member 13 may be lifted upward from the drive chassis 20 while the clamping member 13 is in a posture parallel to the drive chassis 20.

According to the invention described in detail above, even if a clamping elastic member for producing a strong elastic force (biasing force) is not used, a disc can be reliably clamped between the turntable and the clamper. Since the clamping elastic member may be a weak spring, a large localized force does not act upon a mechanical portion, so that an excessive distortion or the like does not occur in any part.

Even when, by the action of the unclamping means, the clamping member is separated from the chassis and is set in an unclamping state, a relatively weak lifting force acts upon the clamping member, thereby making it possible to reduce the load on the unclamping means, and to prevent wearing of any part.

What is claimed is:

1. A disc device comprising:
   a turntable for receiving a disc thereon;
   a clamper for clamping the disc on the turntable;
   a clamping member including a clamping force acting portion for exerting upon the clamper a force for clamping the disc;
   a supporting portion for supporting the clamping member; and
   a clamping elastic member for producing a disc clamping moment having the supporting portion as a fulcrum with respect to the clamping member by applying a force to the clamping member at a location separated from the supporting portion;
   wherein a distance from the supporting portion to a biasing force acting portion upon which a biasing force of the clamping elastic portion acts is greater than a distance from the supporting portion to the clamping force acting portion.

2. A disc device according to claim 1, wherein the supporting portion and the biasing force acting portion upon which the biasing force of the clamping elastic member acts are positioned outwardly of an outer periphery of the disc placed on the turntable.

3. A disc device according to claim 1, wherein the disc clamping moment acts directly on the clamping member from the clamping elastic member.

4. A disc device according to claim 1, further comprising an intermediate member that is subjected to an elastic force from the clamping elastic member, wherein the disc clamping moment acts on the clamping member through the intermediate member.

5. A disc device according to claim 4, further comprising unclamping means for moving the clamping member against the disc clamping moment in a direction in which the clamping member moves away from the turntable.

6. A disc device according to claim 5, further comprising a holding elastic member for biasing the clamping member towards the turntable at a supporting portion side.

7. A disc device according to claim 6, wherein the supporting portion is provided on a chassis supporting the turntable, and wherein, by an elastic force of the holding elastic member, the clamping member is biased so as to come into contact with the supporting portion.

8. A disc device according to claim 5, wherein the supporting portion protrudes from the clamping member, a driving member is provided on the unclamping means for moving the supporting portion against the disc clamping moment in a direction in which the supporting portion moves away from the turntable, and a portion where the supporting portion and the driving member engage is a fulcrum for the disc clamping moment.

9. A disc device according to claim 8, further comprising a holding elastic member for biasing the supporting portion towards the turntable by biasing the driving member.

10. A disc device according to claim 5, wherein the unclamping means for applying an unclamping force to the clamping member in the direction in which the clamping member moves away from the turntable is provided at a side where the biasing force of the clamping elastic member acts, wherein a distance from the supporting portion to an unclamping force acting portion upon which the unclamping force exerted upon the clamping member from the unclamping means acts is greater than the distance from the supporting portion to the clamping force acting portion.

11. A disc device according to claim 5, further comprising a chassis having the turntable mounted thereto and being elastically supported, wherein the unclamping means includes a lock portion for causing the chassis to be in a locked state when the clamping member is moved in the direction in which the clamping member moves away from the turntable.

12. A disc device according to claim 5, further comprising a transfer roller, disposed between the turntable and the clamper, for bringing in the disc, wherein the unclamping means includes a roller position controlling portion for moving the transfer roller away from a disc transfer position when the clamping member is moved towards the turntable.

13. A disc device according to claim 1, further comprising unclamping means for moving the clamping member against the disc clamping moment in a direction in which the clamping member moves away from the turntable.

14. A disc device according to claim 13, further comprising a holding elastic member for biasing the clamping member towards the turntable at a supporting portion side.

15. A disc device according to claim 14, wherein the supporting portion is provided on a chassis supporting the turntable, and wherein, by an elastic force of the holding elastic member, the clamping member is biased so as to come into contact with the supporting portion.

16. A disc device according to claim 13, wherein the supporting portion protrudes from the clamping member, a driving member is provided on the unclamping means for moving the supporting portion against the disc clamping moment in a direction in which the supporting portion moves away from the turntable, and a portion where the supporting portion and the driving member engage is a fulcrum for the disc clamping moment.

17. A disc device according to claim 16, further comprising a holding elastic member for biasing the supporting portion towards the turntable by biasing the driving member.

18. A disc device according to claim 13, wherein the unclamping means for applying an unclamping force to the clamping member in the direction in which the clamping member moves away from the turntable is provided at a side where the biasing force of the clamping elastic member acts, wherein a distance from the supporting portion to an unclamping force acting portion upon which an unclamping force exerted upon the clamping member from the unclamping means acts is greater than the distance from the supporting portion to the clamping force acting portion.

19. A disc device according to claim 13, further comprising a chassis having the turntable mounted thereto and being elastically supported, wherein the unclamping means includes a lock portion for causing the chassis to be in a locked state when the clamping member is moved in the direction in which the clamping member moves away from the turntable.

20. A disc device according to claim 13, further comprising a transfer roller, disposed between the turntable and the clamper, for bringing in the disc, wherein the unclamping means includes a roller position controlling portion for moving the transfer roller away from a disc transfer position when the clamping member is moved towards the turntable.

* * * * *